US012739077B2

(12) United States Patent
Nammi et al.

(10) Patent No.: US 12,739,077 B2
(45) Date of Patent: Sep. 15, 2026

(54) NETWORK NODE, USER EQUIPMENT AND METHODS IN A WIRELESS COMMUNICATIONS NETWORK

(71) Applicant: Telefonaktiebolaget LM Ericsson (publ), Stockholm (SE)

(72) Inventors: Sairamesh Nammi, Austin, TX (US); Namir Lidian, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 18/294,156

(22) PCT Filed: Aug. 25, 2021

(86) PCT No.: PCT/SE2021/050821

§ 371 (c)(1),
(2) Date: Jan. 31, 2024

(87) PCT Pub. No.: WO2023/027615

PCT Pub. Date: Mar. 2, 2023

(65) Prior Publication Data

US 2024/0260028 A1 Aug. 1, 2024

(51) Int. Cl.
*H04L 5/00* (2006.01)
*H04W 72/0446* (2023.01)
(Continued)

(52) U.S. Cl.
CPC ....... *H04L 5/0051* (2013.01); *H04W 72/0446* (2013.01); *H04W 72/23* (2023.01); *H04W 72/541* (2023.01)

(58) Field of Classification Search
CPC ......... H04W 72/1268; H04W 72/0446; H04W 72/541; H04W 72/23; H04L 5/0051; H04L 5/00; H04L 25/0224; H04J 11/005
See application file for complete search history.

(56) References Cited

U.S. PATENT DOCUMENTS

2014/0321313 A1 10/2014 Seo et al.
2016/0036542 A1* 2/2016 Gong .................... H04W 24/10 370/329

(Continued)

FOREIGN PATENT DOCUMENTS

EP 3651398 A1 5/2020
JP 2020-129707 A 8/2020

(Continued)

OTHER PUBLICATIONS

NTT Docomo, "User Device and Interference Measuring Method", Aug. 27, 2020, JP, JP 2020129707 (Foreign Patent Documents citation #1, listed on IDS dated Jan. 24, 2025, citations are from English translation) (Year: 2020).*

(Continued)

*Primary Examiner* — Michael K Phillips
(74) *Attorney, Agent, or Firm* — Nicholson De Vos Webster & Elliott LLP

(57) ABSTRACT

A method performed by a network node for assisting a User Equipment (UE) in detecting front loaded Demodulation Reference Signals (DMRS) and one or more additional DMRS symbols in a wireless communications network is provided. The network node obtains a first scheduling information about the front loaded DMRS and the one or more additional DMRS in a current slot scheduled in the cell. The network node obtains (a second scheduling information about empty symbols in the current slot from an interfering cell. The network node decides, based on the first and second scheduling information, which one or more out of option 1 (accumulated DMRS) and option 2 (individual DMRS), to use for computing covariance at the UE. The network node sends an indication to the UE, recommending which one or more out of option 1 and option 2, to use for computing covariance at the UE.

12 Claims, 19 Drawing Sheets

(51) Int. Cl.
*H04W 72/23* (2023.01)
*H04W 72/541* (2023.01)

(56) References Cited

U.S. PATENT DOCUMENTS

| | | | | |
|---|---|---|---|---|
| 2018/0316534 | A1* | 11/2018 | Shin | H04L 27/2602 |
| 2020/0153590 | A1 | 5/2020 | Ko et al. | |
| 2021/0243777 | A1* | 8/2021 | Tsai | H04W 74/006 |
| 2023/0188294 | A1* | 6/2023 | Qu | H04W 72/23 370/329 |
| 2023/0231610 | A1* | 7/2023 | Levitsky | H04B 7/0632 370/329 |
| 2023/0344600 | A1* | 10/2023 | Levitsky | H04B 7/0626 |

FOREIGN PATENT DOCUMENTS

| | | | |
|---|---|---|---|
| WO | 2018044715 | A1 | 3/2018 |
| WO | 2018230735 | A1 | 12/2018 |

OTHER PUBLICATIONS

European search report and Search Opinion, EP App. No. 21955192.6, Oct. 11, 2024, 11 pages.

International Preliminary Report on Patentability, PCT App. No. PCT/SE2021/050821, Mar. 7, 2024, 12 pages.

International Search Report and Written Opinion, Application No. PCT/SE2021/050821, Apr. 28, 2022, 17 pages.

Abigaba et al., "Investigation of Interference Rejection Suppression in MIMO Systems," 2013, 64 pages, Master's Thesis, Department of Electrical and Information Technology, Faculty of Engineering, LTH, Lund University, SE-221 00 Lund, Sweden.

Intel Corporation, "On PT-RS for CP-OFDM," Jun. 27-30, 2017, 10 pages, 3GPP TSG RAN WG1 NR Ad Hoc Meeting, R1-1710535, Qingdao, China.

* cited by examiner

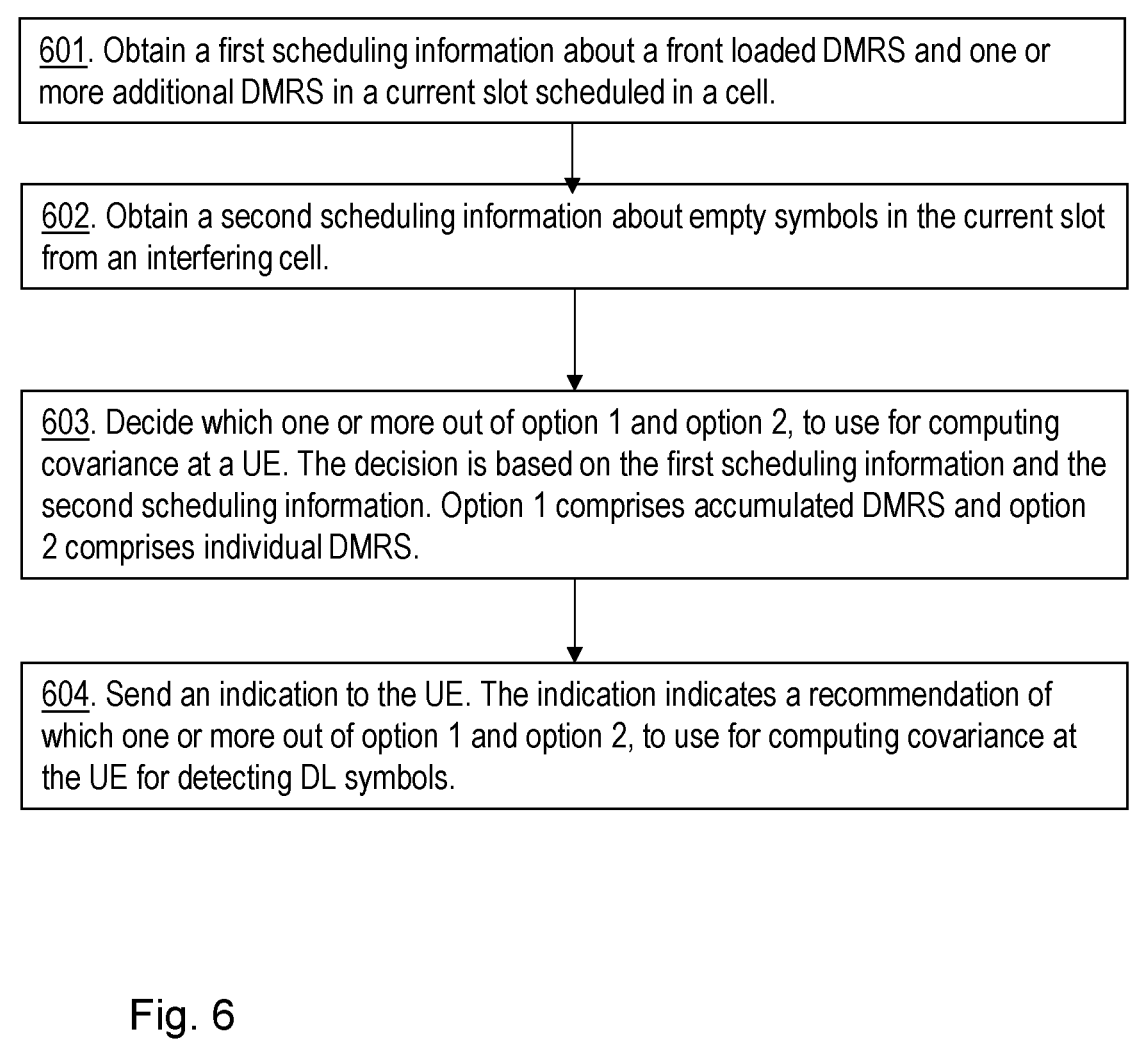

601. Obtain a first scheduling information about a front loaded DMRS and one or more additional DMRS in a current slot scheduled in a cell.

602. Obtain a second scheduling information about empty symbols in the current slot from an interfering cell.

603. Decide which one or more out of option 1 and option 2, to use for computing covariance at a UE. The decision is based on the first scheduling information and the second scheduling information. Option 1 comprises accumulated DMRS and option 2 comprises individual DMRS.

604. Send an indication to the UE. The indication indicates a recommendation of which one or more out of option 1 and option 2, to use for computing covariance at the UE for detecting DL symbols.

Fig. 6

Example 3

Example 5

NETWORK NODE, USER EQUIPMENT AND METHODS IN A WIRELESS COMMUNICATIONS NETWORK

CROSS-REFERENCE TO RELATED APPLICATIONS

This application is a National stage of International Application No. PCT/SE2021/050821, filed Aug. 25, 2021, which is hereby incorporated by reference.

TECHNICAL FIELD

Embodiments herein relate to a network node, a User Equipment (UE) and methods therein. In some aspects, they relate to assisting the UE in detecting Downlink (DL) symbols to be received by the UE in a wireless communications network.

BACKGROUND

In a typical wireless communication network, wireless devices, also known as wireless communication devices, mobile stations, stations (STA) and/or User Equipments (UE)s, communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimeter wave range have shorter range but higher available bandwidth than bands in the FR1.

Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may benefit when each UE only has one antenna. Such systems and/or related techniques are commonly referred to as MIMO.

To meet a huge demand for data centric applications, 3GPP is currently discussing to extend the 4G standards to 5G also called as NR access. The following are the requirements for 5G networks:

- Data rates of several tens of megabits per second should be supported for tens of thousands of users,
- 1 gigabit per second to be offered simultaneously to tens of workers on the same office floor,
- Several hundreds of thousands of simultaneous connections to be supported for massive sensor deployments,
- Spectral efficiency should be significantly enhanced compared to 4G,
- Coverage should be improved,
- Signaling efficiency should be enhanced,
- Latency should be reduced significantly compared to LTE.

As mentioned above, MIMO systems significantly increases the data carrying capacity of wireless systems. For these reasons, MIMO is an integral part of the 3rd and 4th generation wireless systems. 5G systems will also employ MIMO systems also referred to as massive MIMO systems, hundreds of antennas at the Transmitter side and/or Receiver side. Typically, with an Nt and Nr, where Nt denotes the number of transmit antennas and Nr denotes the receive antennas, the peak data rate multiplies with a factor of Nt over single antenna systems in rich scattering environment.

Message Sequence Chart for Downlink Data Transfer

FIG. 1*a* shows the typical message sequence chart for downlink data transfer from a gNB to a UE in 5G systems. From the pilot or reference signals 11, the UE computes 12 the channel estimates then computes the parameters needed for Channel State Information (CSI) reporting. The CSI report comprises for example channel quality indicator (CQI), precoding matrix index (PMI), rank information (RI), CSI-RS Resource Indicator (CRI) the same as beam indicator), etc.

The CSI report is sent 13 to the gNB via a feedback channel either on request from the network a-periodically or configured to report periodically. The gNB scheduler uses this information in determining 14 the parameters for scheduling of this particular UE. The network sends 15 the scheduling parameters to the UE in the downlink control channel. After that actual data transfer 16 takes place from network to the UE.

Downlink Reference Signals

Downlink reference signals are predefined signals occupying specific resource elements within the downlink time-frequency grid. There are several types of downlink reference signals that are transmitted in different ways and used for different purposes by the receiving terminal such as e.g.:

- CSI reference signals (CSI-RS): These reference signals are specifically intended to be used by terminals to acquire CSI and beam specific information (beam RSRP). In 5G CSI-RS is UE specific so it can have a significantly lower time/frequency density.
- Demodulation reference signals (DM-RS also referred to as DMRS): These reference signals also sometimes referred to as UE-specific reference signals, are specifically intended to be used by UEs for channel estimation for data channel. The label "UE-specific"

relates to the fact that each demodulation reference signal is intended for channel estimation by a single terminal. That specific reference signal is then only transmitted within the resource blocks assigned for data traffic channel transmission to that terminal.

Other than these reference signals, there are other reference signal namely phase tracking and tracking and sounding reference signals used various purposes which are not relevant for this invention.

Uplink Control Channel:

The uplink control channel carries information about Hybrid automatic repeat request (HARQ)-Acknowledgement (ACK) information corresponding to DL data transmission, and channel state information. The channel state information typically comprises CRI, RI, CQI, PMI and Layer Indicator etc. The CSI may be divided into two categories. One for sub-band and the other is for wideband. The configuration of sub-band or wideband CSI reporting is done through Radio Resource Control (RRC) signalling as part of CSI reporting configuration. Table 1 below, shows the contents of CSI report for PMI format indicator=Wideband, CQI format indicator=wideband and for PMI format indicator=sub-band, CQI format indicator=sub-band.

DL Control Channel (DCI):

The Physical Downlink Control Channel (PDCCH) carries information about the scheduling grants. Typically, this comprises the number of MIMO layers scheduled, transport block sizes, modulation for each codeword, parameters related to HARQ, sub-band locations etc. The layers when used herein may mean the number of independent data streams. Note that, all DCI formats may not use transmit all the information as shown above. In general, the contents of PDCCH depends on transmission mode and DCI format.

Typically, the following information is transmitted by means of the DCI format:

- Carrier indicator
- Identifier for DCI formats
- Bandwidth part indicator
- Frequency domain resource assignment
- Time domain resource assignment
- Viritual Resource Blocks (VRB)-to-PRB mapping flag
- PRB bundling size indicator
- Rate matching indicator
- Zero-Power (ZP) CSI-RS trigger
- Modulation and coding scheme for each Transport Block (TB)
- New data indicator for each TB
- Redundancy version for each TB

TABLE 1

Contents of CSI report for both wideband and side band

| PMI-FormatIndicator=widebandPMI and CQI-FormatIndicator=widebandCQI | PMI-FormatIndicator= subbandPMI or CQI-FormatIndicator=subbandCQI | | |
|---|---|---|---|
| | | CSI Part II | |
| | CSI Part I | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

Note that for NR, the sub-band is defined according to the bandwidth part of the Orthogonal Frequency-Division Multiplexing (OFDM) in terms of Physical Resource Blocks (PRBs) as shown in Table 2 below. The sub-band configuration is also done through RRC signalling.

TABLE 2

Configurable sub-band sizes

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

- HARQ process number
- DL Assignment Index
- Transmit Power Control (TPC) command for UL control channel
- PUCCH resource indicator
- PDSCH-to-HARQ feedback timing indicator
- Antenna port(s)
- Transmission configuration indication
- Sounding Reference Signal (SRS) request
- Code Block Group (CBG) transmission information
- CBG flushing out information
- DMRS sequence initialization MIMO Background As mentioned above, MIMO systems significantly increases data carrying capacity of wireless communications systems. MIMO may be used for achieving diversity gain, spatial multiplexing gain, and beamforming gain. For these reasons, MIMO is an integral part of the 3rd, 4th and 5th generation wireless systems.

DMRS are transmitted in a MIMO system. At a gNode B transmitter, common reference signals namely CSI-RS are transmitted for channel sounding. A UE receiver estimates channel quality, typically Signal-to-Interference Ratio (SINR), from channel sounding, and computes a preferred precoding matrix (PMI), rank indicator (RI), and CQI for the next downlink transmission. This information may be referred to as CSI. The UE conveys this information through the feedback channel as mentioned above.

For downlink data transmission, the gNode B uses this information and chooses the precoding matrix as suggested by the UE, or it may choose on its own other than the UE recommended PMI), CQI and the transport block size etc. Finally, both the reference signal (DM-RS) and the data are multiplied by the precoding matrix selected by the gNode B and transmitted. The UE receiver estimates the effective channel, i.e. the channel multiplied by the precoding matrix, and demodulates the data.

DMRS Resource Mapping

Resource mapping when used herein means how the transmitted symbols are mapped to the OFDM time-frequency resource grid. An example shown in FIG. 1*b*, is a Demodulation Reference Signals (DMRS), also referred to as DM-RS, structure for 4 antenna ports, 0, 1, 2 and 3, hence maximum 4 layers and 4 DMRS, in NR system. Reference symbols within a resource-block are transmitted for a single antenna port 0. A symbol when used herein e.g. means a known QPSK modulated reference data. The same reference symbols are code multiplexed and transmitted on antenna port 1. Similarly for ports 2 and 3 same resource elements are used for transmitting DMRS reference symbols. However, they are code multiplexed as in port 0 and 1. The resource elements that are used for rank 3 and 4, i.e., ports 2 and 3, are orthogonal in frequency to that of port 0 and 1.

As the number of transmitted layers may vary dynamically, the number of transmitted DMRS may also vary. The UE is informed about the number of transmitted layers, or the rank, as part of the scheduling information via downlink control channel as explained above.

For example, if the number of layers is equal to 4, then the DMRS looks like as shown in FIG. 2. FIG. 2 depicts resource mapping for DMRS with 4 layer transmission. To differentiate the DMRS of symbol 3for the four layers, each layer is represented by a box with a pattern that is different from the other layers.

In FIGS. 2, 3 and 4, the x-axis is the symbol number in time units and the y-axis is the sub carrier index in frequency domain.

In addition to front loaded DMRS, the NR specification allows additional DMRS in later part of the slots. Front loaded DMRS when used herein e.g. means that the DMRS is sent before the data is transmitted. For example, to improve the channel estimation quality at the receiver or for high mobility UEs or for higher modulations etc., FIG. 3 shows a resource mapping diagram with one additional DMRS at 11th symbol. In addition to one additional DMRS, the specification provides up to three additional DMRS in addition to the front loaded DMRS. FIG. 3 depicts resource mapping for DMRS with a four layer transmission with one additional DMRS. Also in FIG. 3, to differentiate the DMRS of symbol 3 for the four layers, each layer is represented by a box with a pattern that is different from the other layers. The different patterned boxes of the additional DMRS symbol 11 and the diagonal stripes are differentiated by an orthogonal code.

Conventionally Minimum Mean Square Error—Interference Rejection Combining (MMSE-IRC) receivers are used to decode the transmitted signal. A MMSE-IRC receiver estimates noise and co-channel interference from a received signal. In general, to estimate the noise and co-channel interference, it uses covariance estimation to indicate the power which is a second order statistics. It is common to use the DMRS to estimate covariance. When interfering cells are fully loaded, estimating the covariance from DMRS is straightforward as the UE accumulates the front loaded DMRS and additional DMRS (if any) and estimate the covariance based on the DMRS symbols. Unlike 4G LTE, where the base station schedules a whole slot, i.e. all the symbols, for data transmission, 5G NR may only schedule a few symbols in a slot for data transmission. In addition, 5G NR supports multiple services such as enhanced Mobile Broadband (eMBB), Ultra-Reliable Low-Latency Communication (URLLC) etc. As an example, FIG. 4 shows a scenario when a serving base station uses front loaded DMRS and one additional DMRS for data transmission, while an interfering base station such as a gNB, e.g. another sector in the same cell, uses only a few slots. A sector when used herein may mean a part of the cell or area within the cell. FIG. 4 depicts a scenario considered for covariance estimation.

In FIGS. 4, the control channel is represented by diagonal brick paving patterned boxes, PDSCH is represented by white boxes with black dotted patterns, front loaded DMRS is represented by black boxes with white dotted patterns, and the one or more additional DMRS are represented by horizontal brick paving patterned boxes.

SUMMARY

As part of developing embodiments herein the inventors have identified a problem which first will be discussed.

In the above case illustrated in FIG. 4, if the UE receiver uses the conventional method of estimating the covariance that is accumulating all the serving cell DMRS, the measurement does not reflect the actual covariance estimation as few symbols are experiences interference from the other cell, while the other symbols does not experience any interference from the other cell as the symbols are empty. Applying the computed covariance estimation using conventional method in MMSE-IRC weight computation results in erroneous detection of data bits. This in turn reduces the throughout and the system capacity.

An object of embodiments herein is to improve the performance of a wireless communications network using additional DMRS.

According to an aspect of embodiments herein, the object is achieved by a method performed by a network node for assisting a UE in detecting DL symbols to be received by the UE in a wireless communications network. The symbols comprise front loaded DMRS and one or more additional DMRS. The network node serves the UE in a cell. The network node obtains a first scheduling information about the front loaded DMRS and the one or more additional DMRS in a current slot scheduled in the cell. The network node obtains a second scheduling information about empty symbols in the current slot from an interfering cell. The network node decides which one or more out of option 1 and option 2, to use for computing covariance at the UE, based on the first scheduling information and the second scheduling information. Option 1 comprises accumulated DMRS and option 2 comprises individual DMRS. The network node sends an indication to the UE. The indication indicates a recommendation based on the deciding of which one or more out of option 1 and option 2, to use for computing covariance at the UE, for detecting DL symbols.

According to another aspect of embodiments herein, the object is achieved by a method performed by a UE for detecting received DL symbols to be received by the UE in a wireless communications network. The received symbols comprise front loaded DMRS and one or more additional DMRS. A network node serves the UE in a cell. The UE receives an indication from the network node. The indication indicates a recommendation of which one or more out of option 1 and option 2, to use for computing covariance at the UE. Option 1 comprises accumulated DMRS and option 2 comprises individual DMRS. The UE receives information about a symbol level interference from the network node. The UE computes a covariance according to the recommendation and based on the information about a symbol level interference. The UE determines receiver weights based on the computed covariance. The UE detects received DL symbols based on the determined receiver weights.

According to another aspect of embodiments herein, the object is achieved by a network node configured to assist a UE in detecting DL symbols to be received by the UE in a wireless communications network. The symbols are adapted to comprise front loaded DMRS and one or more additional DMRS. The network node is adapted to serve the UE in a cell. The network node is further configured to:

obtain a first scheduling information about the front loaded DMRS and the one or more additional DMRS in a current slot scheduled in the cell, obtain a second scheduling information about empty symbols in the current slot from an interfering cell, decide which one or more out of option 1 and option 2, to use for computing covariance at the UE, based on the first scheduling information and the second scheduling information, wherein option 1 is adapted to comprise accumulated DMRS and option 2 is adapted to comprise individual DMRS, send an indication to the UE, which indication is adapted to indicate a recommendation based on the deciding of which one or more out of option 1 and option 2, to use for computing covariance at the UE, for detecting DL symbols.

According to another aspect of embodiments herein, the object is achieved by a UE configured to detect received DL symbols to be received by the UE in a wireless communications network. The received symbols are adapted to comprise front loaded DMRS and one or more additional DMRS. The network node is adapted to serve the UE in a cell The UE is further configured to:

receive an indication from the network node, which indication is adapted to indicate a recommendation of which one or more out of option 1 and option 2, to use for computing covariance at the UE, wherein option 1 is adapted to comprise accumulated DMRS and option 2 is adapted to comprise individual DMRS, receive from the network node, information about a symbol level interference, compute a covariance according to the recommendation and based on the information about a symbol level interference, determine receiver weights based on the computed covariance, and detect received DL symbols based on the determined receiver weights.

Thanks to that the network node decides an option based on the scheduling information and recommends the option to be used for computing covariance at the UE, the UE is capable to compute a more accurate covariance based on the recommendation. This results in better determined receiver weights, and more correct detected received DL symbols. This in turn results in an improved performance of a wireless communications network using additional DMRS in terms of link throughput and system capacity.

Some advantages provided by embodiments herein thus comprises an accurate estimation of covariance such as covariance matrix and receiver weights such as MMSE-IRC weights with additional DMRS(s), and improved performance in terms of link throughput and system capacity.

BRIEF DESCRIPTION OF THE DRAWINGS

Examples of embodiments herein are described in more detail with reference to attached drawings in which:

FIG. 6 is a flowchart depicting an embodiment of a method in a network node.

DETAILED DESCRIPTION

Some example embodiments herein are related to wireless communication systems and e.g. methods related to UE receiver covariance estimation e.g. in a multi antenna system with the assistance from a network node such as e.g. a base station, and in this way assist the UE in detecting received signals comprising one or more additional DMRS.

Embodiments herein provide an efficient way to estimate covariance when a network node of a serving cell uses additional DMRS.

Figure 1A:
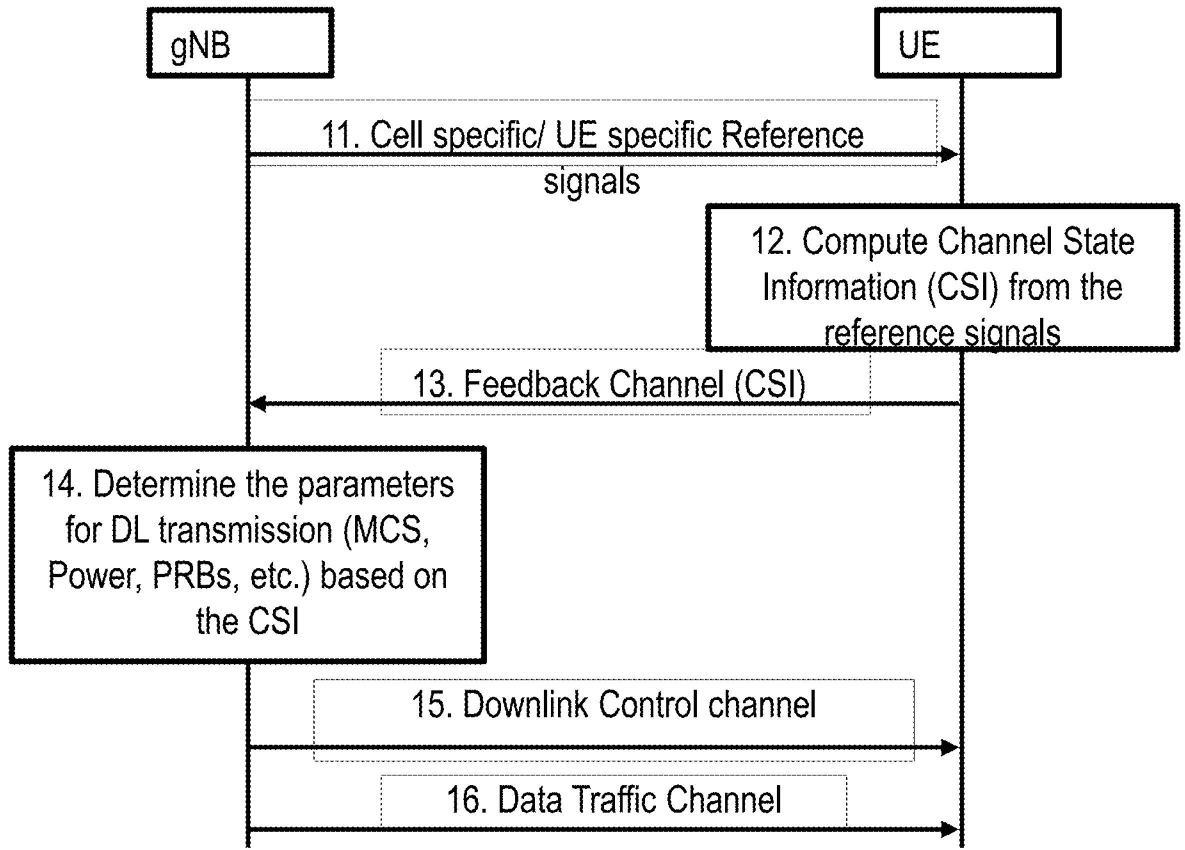
FIG. 1*a* is a schematic block diagram illustrating prior art.
Figure 1B:
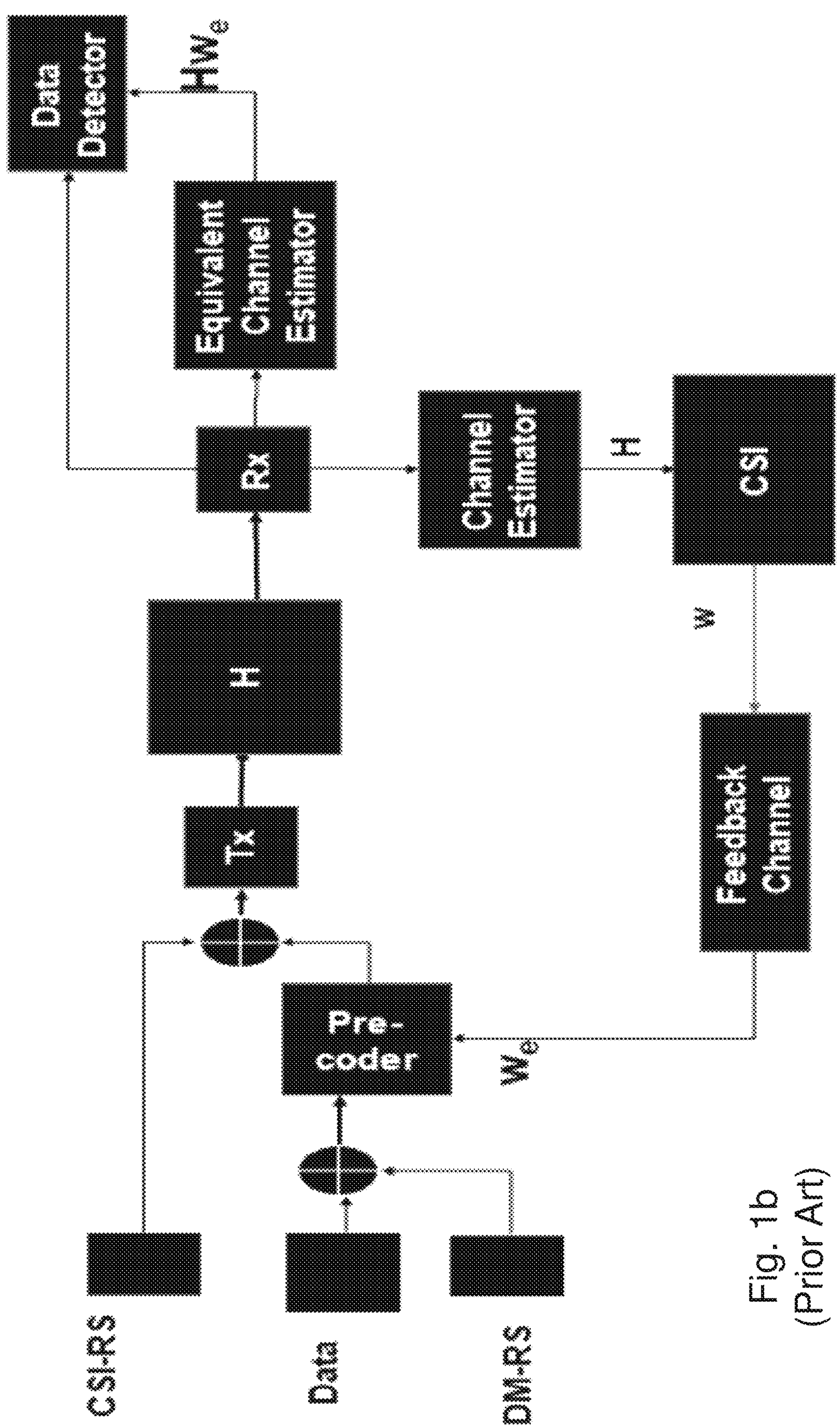
FIG. 1*b* is a schematic block diagram illustrating prior art.
Figure 2:
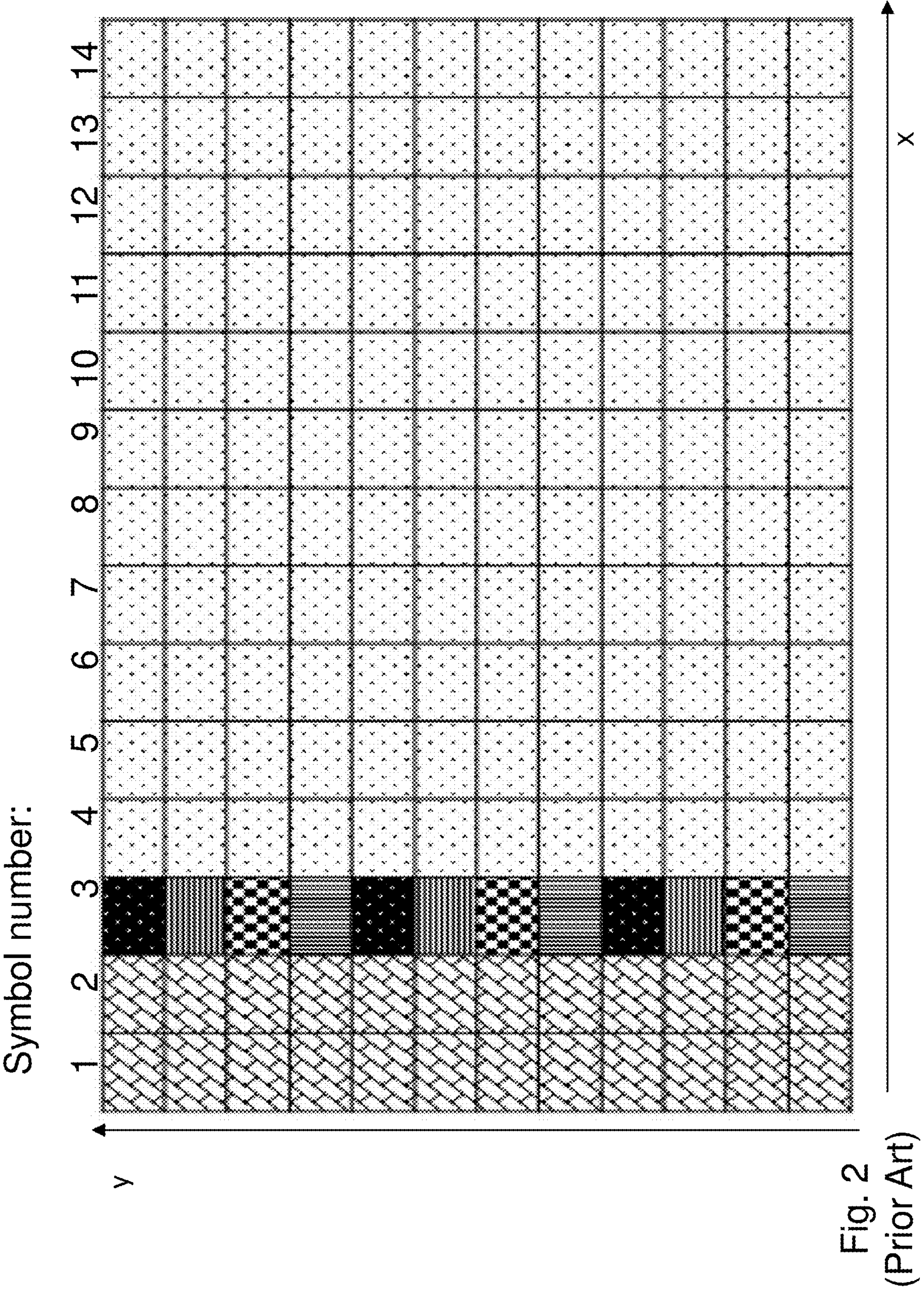
FIG. 2 is a schematic block diagram illustrating prior art.
Figure 3:
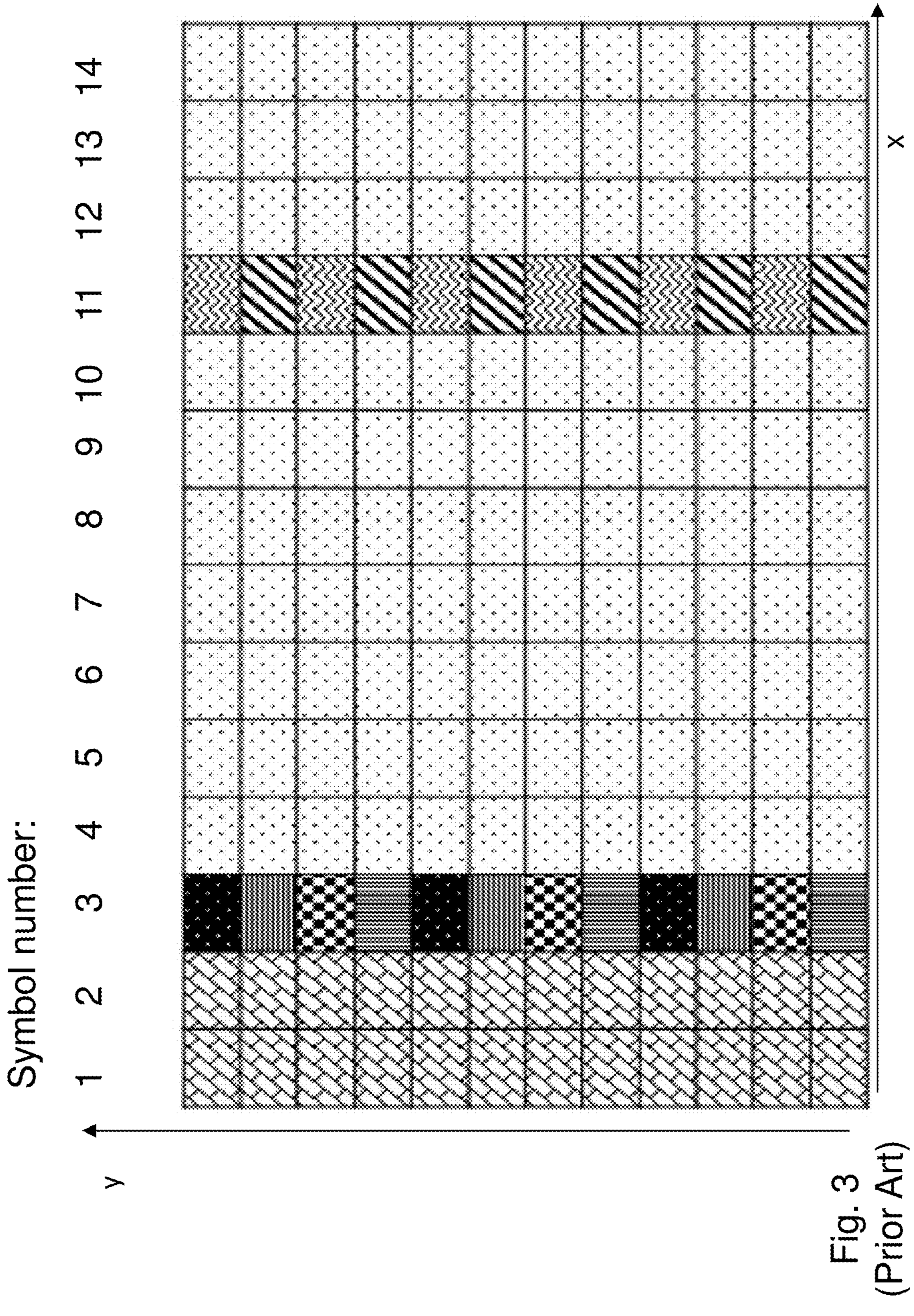
FIG. 3 is a schematic block diagram illustrating prior art.
Figure 4:
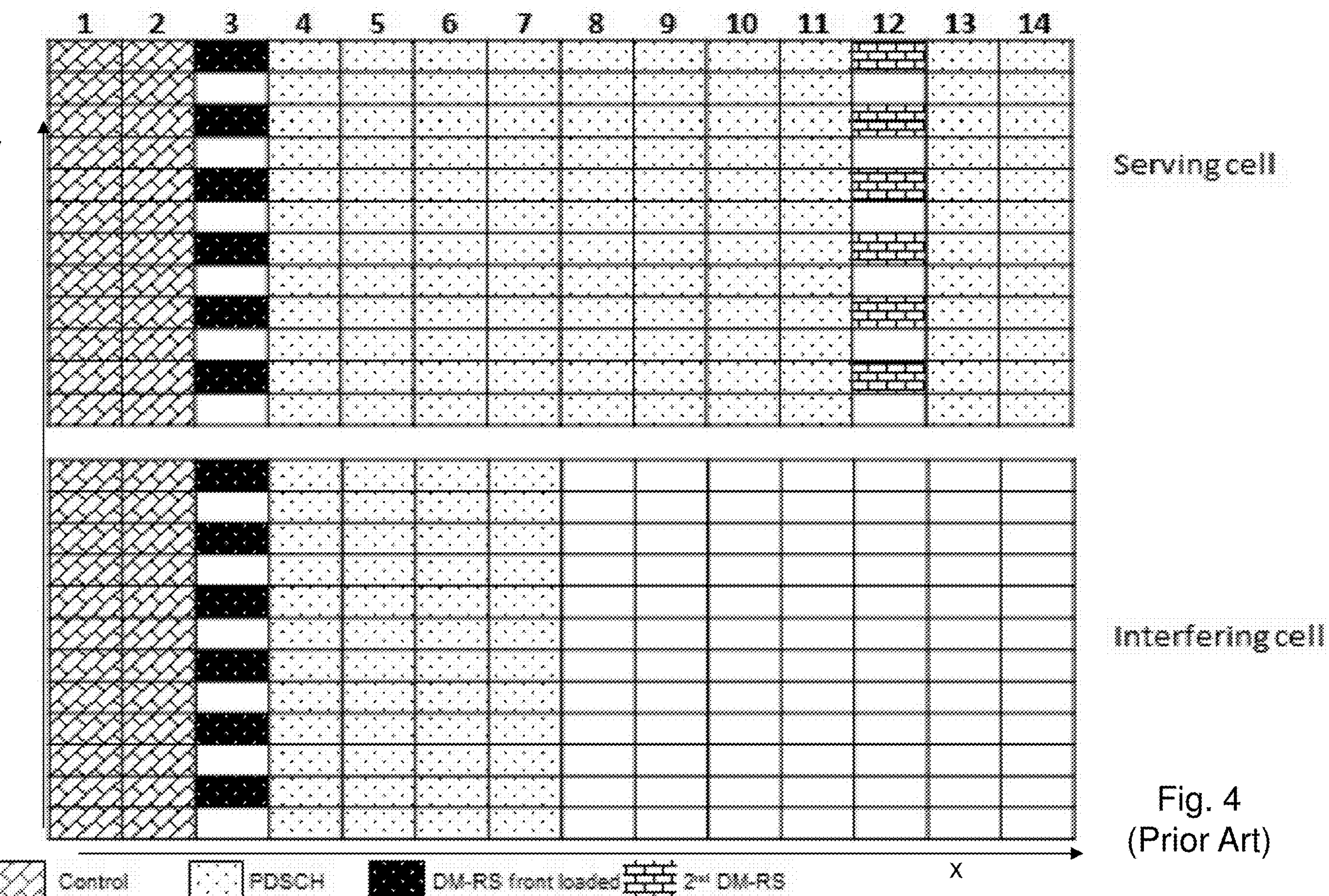
FIG. 4 is a schematic block diagram illustrating prior art.
Figure 5:
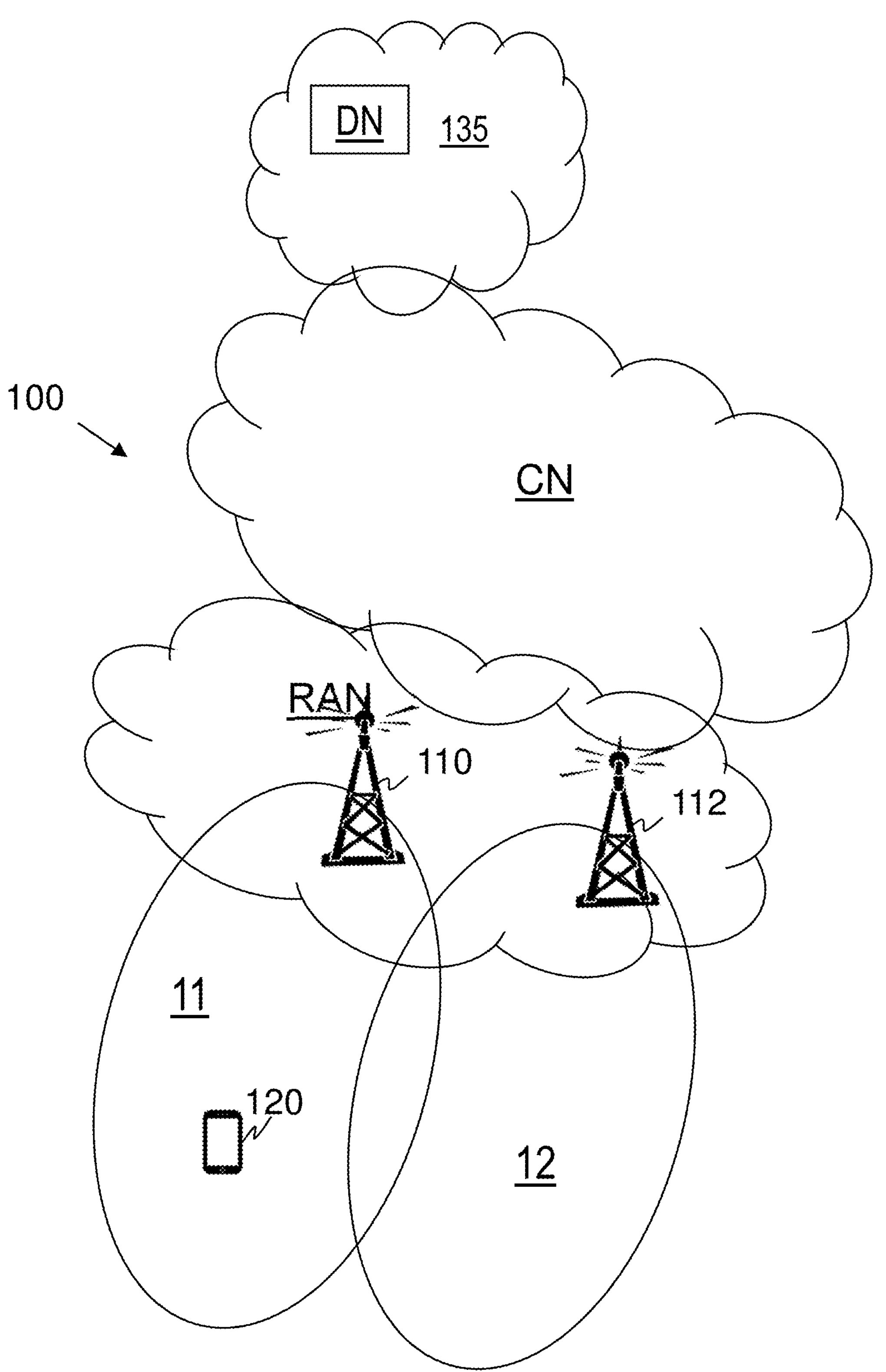
FIG. 5 is a schematic block diagram illustrating embodiments of a wireless communications network.

FIG. 5 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g., a network node 110. The network node 110 provides radio coverage in one or more cells which may also be referred to as a service area, a beam or a beam group of beams, such as e.g. a cell 11.

Further, a neighboring network node 112 operate in the wireless communications network 100. The neighboring network node 112 provides radio coverage in one or more cells, such as e.g. a cell 12.

The cell 12 is an interfering cell towards the cell 11.

The network nodes 110 and 112 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, an NG-RAN node, a base transceiver station, a radio remote unit, an Access Point Base Station, a base station router, a transmission arrangement of a radio base station, a stand-alone access point or any other network unit capable of communicating with UEs, such as e.g. a UE 120, within the service area served by the network node 110 depending e.g. on the first radio access technology and terminology used. The network node 110 may communicate with UEs such as a UE 120, in DL transmissions to the UEs and UL transmissions from the UEs.

A number of UEs operate in the wireless communication network 100, such as e.g. the UE 120. The UE 120 may also be referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g., smart phone, laptop, mobile phone, sensor, relay, mobile tablets or even a small base station communicating within a cell.

The UE 120 may be served by the network node 110, e.g. when being located in cell 11.

Methods herein may be performed by the network node 110. As an alternative, a Distributed Node (DN) and functionality, e.g. comprised in a cloud 135 as shown in FIG. 5, may be used for performing or partly performing the methods herein.

A number of embodiments will now be described, some of which may be seen as alternatives, while some may be used in combination.

Embodiments herein provide a mechanism for the UE 120 to compute receiver weights when the serving network node 110 uses additional DMRS(s) for channel and covariance estimation. In an example of the provided algorithm, the UE 120 with the assistance from the network node 110 decides whether to accumulate all the DMRS symbols, compute the covariance estimation and apply this covariance matrix in computing MMSE-IRC weights for a whole slot, i.e. all the symbols in the slot, or compute the covariance estimation for each DMRS and apply the computed covariance estimation for MMSE-IRC weight computation for the part of slot (a few symbols) or a combination thereof. The methods involve multiple embodiments at the network node 110 and the UE 120 and a summarized example is performed as below:

A method in the network node 110 is performed by:

- Obtaining scheduling information about the empty symbols in the current slot from the neighboring sectors.
- Deciding whether it is better to compute Covariance at the UE 120, e.g. at the receiver of the UE 120, by using accumulated DMRS or individual DMRS, or both.
- Communicating or transmitting to the UE 120, recommending information related to the determination method for estimating the covariance to the UE 120. This may e.g. be an information about symbol level interference in aiding the covariance estimation.

A method in the UE 120 is performed by:

- Receiving from the network node 110 the recommending information related to the determination method for estimating the covariance to the UE 120, such as e.g. the information about symbol level interference in aiding the covariance estimation
- Computing the covariance according to the recommended method.
- Determine the receiver weights based on the computed covariance.
- Detect the received symbols by means of the computed covariance.

This means for example that methods are provided to assist the UE 120 in computing the covariance estimation e.g. for determining the MMSE-IRC weights, when the UE 120 is configured with more than one DMRS in a slot.

An advantage of embodiments herein e.g. comprises accurate estimation of covariance matrix and the MMSE-IRC weights with additional DMRS(s). This is since the provided method uses only those symbols which experienced the same interference for covariance estimation.

A further advantage of embodiments herein e.g. comprises an improved performance in terms of link throughput and system capacity. This is since the receiver uses the accurate estimation of receiver weights which will compensate the interference.

FIG. 6 shows example embodiments of a method performed by a network node 110 for assisting the UE 120 in detecting DL symbols to be received by the UE 120 in a wireless communications network 100. The symbols comprise front loaded DMRS and one or more additional DMRS. The network node 110 serves the UE 120 in the cell 11.

The method comprises the following actions, which actions may be taken in any suitable order. Optional actions are referred to as dashed boxes in FIG. 6.

Action 601

The network node 110 obtains a first scheduling information about the front loaded DMRS and the one or more additional DMRS in a current slot scheduled in the cell 11.

A slot when used herein means a time for transmitting the transmitting symbols.

The first scheduling information related to the scheduling information in the current cell may e.g. comprise sending the reference signals for obtaining the channel state information.

The first scheduling information is needed to obtain the accurate channel information for properly choosing the scheduling parameters.

The first scheduling information may be obtained from the channel state information reported by the UE 120 and decided by the network node 110.

Action 602

The network node 110 further obtains a second scheduling information about empty symbols in the current slot from an interfering cell 12.

The second scheduling information may be about empty symbols in the current slot from the interfering cell 12 and may e.g. comprise symbols where there is a transmission from the neighbouring network node 112 to UEs.

The second scheduling information is needed to understand whether there is a transmission from the neighbouring network node 112 in the interfering cell 12 or not. The second scheduling information may be obtained by being received from the neighbouring network node 112.

Action 603

The network node 110 then decides which one or more out of option 1 and option 2, to use for computing covariance, such as e.g. a covariance matrix, at the UE 120, based on the first scheduling information and the second scheduling information. Option 1 comprises accumulated DMRS and option 2 comprises individual DMRS.

A covariance when used herein e.g. means E[(Y-Hx)(Y-Hx)/\h)], where the E is the expection or average operation, Y is the received symbols on the DMRS resource elements, H is the channel matrix estimated, x is the DMRS symbols, and the operation /\h is the Hermitian operation of a matrix.

The below examples will be described more in detail later on in this text.

Example 1, 2, 3, 4, and 5. The deciding of which one or more out of option 1 and option 2, to use for computing covariance at the UE 120, based on the first scheduling information and the second scheduling information may in some embodiments comprise: Identifying whether or not each symbol of the current slot scheduled in the cell 11 experiences interference or not from the interfering cell 12. In these embodiments:

When each symbol of the current slot scheduled in the cell 11 experiences interference from the interfering cell 12, deciding to compute covariance at the UE 120 by using option 1, and when each symbol of the current slot scheduled in the cell 11 does not experience interference from the interfering cell 12, deciding to compute covariance at the UE 120 by using option 2.

Example 2, 4, and 5. The deciding of which one or more out of option 1 and option 2, to use for computing covariance at the UE 120, based on the first scheduling information and the second scheduling information may in some other embodiments comprise:

Identifying that each symbol, e.g. symbols 1-7, of one or more first parts of the current slot scheduled in the cell 11 experiences interference from the interfering cell 12, and deciding to compute covariance at the UE 120 by using option 1, for the one or more first parts of the current slot scheduled in the cell 11.

Identifying that no symbol, e.g. symbols 8-14, of one or more second parts of the current slot scheduled in the cell 11 does experience interference from the interfering cell 12, and deciding to compute covariance at the UE 120 by using option 2 for the one or more second parts of the current slot scheduled in the cell 11.

Example 3, 4, 5. The deciding of which one or more out of option 1 and option 2, to use for computing covariance at the UE 120, based on the first scheduling information and the second scheduling information may in some further embodiments comprise:

Identifying that no symbol, e.g. symbols 1-7, of one or more third parts of the current slot scheduled in the cell 11 does experience interference of the one or more interfering cells 12. Further identifying that each symbol, e.g. symbols 8-14, of one or more fourth parts of the current slot scheduled in the cell 11 does experience some interference from one or more interfering cells 12. Deciding to compute covariance at the UE 120 by using option 2, for both the one or more third parts and the one or more fourth parts of the current slot scheduled in the cell 11.

Action 604

The network node 110 sends an indication to the UE 120. The indication indicates a recommendation of which one or more out of option 1 and option 2, to use for computing covariance at the UE 120, for detecting DL symbols.

Figure 7:
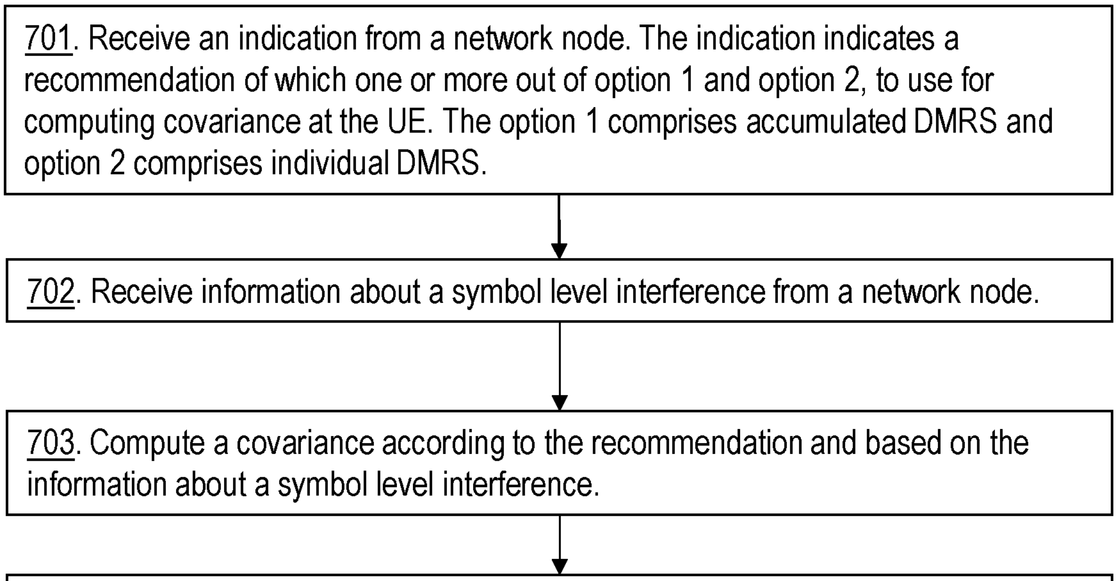
FIG. 7 is a flowchart depicting an embodiment of a method in a UE.

FIG. 7 shows example embodiments of a method performed by the UE 120 for detecting received DL symbols to be received by the UE 120 in the in a wireless communications network 100. The received symbols comprise front loaded DMRS and one or more additional DMRS. As mentioned above, the network node 110 serves the UE 120 in the cell 11.

The method comprises the following actions, which actions may be taken in any suitable order. Optional actions are referred to as dashed boxes in FIG. 7.

Action 701

The UE 120 receives an indication from the network node 110. The indication indicates a recommendation of which one or more out of option 1 and option 2, to use for computing covariance at the UE 120. The option 1 comprises accumulated DMRS and option 2 comprises individual DMRS.

The recommendation may be based on a first scheduling information about the front loaded DMRS and the one or more additional DMRS in a current slot scheduled in the cell 11, and a second scheduling information about empty symbols in the current slot from an interfering cell 12.

In some embodiments, the recommendation of which one or more out of option 1 and option 2, to use for computing covariance at the UE 120 based on the first scheduling information and the second scheduling information, comprises that it is based on whether or not each symbol of the current slot scheduled in the cell 11 experiences interference or not from an interfering cell 12. In these embodiments:

When each symbol of the current slot scheduled in the cell 11 experiences interference from the interfering cell 12, the indication recommends to compute covariance at the UE 120 by using option 1, and when each symbol of the current slot scheduled in the cell 11 does not experience interference from the interfering cell 12, the indication recommends to compute covariance at the UE 120 by using option 2.

The below examples as also have been described above, will be described more in detail later on in this text.

Example 2, 4, 5. In some other embodiments, the recommendation of which one or more out of option 1 and option 2, to use for computing covariance at the UE 120, based on the first scheduling information and the second scheduling information comprises:

When each symbol, such as e.g., of symbols 1-7, of one or more first parts of the current slot scheduled in the cell 11 experiences interference from the interfering cell 12, the recommendation comprises to compute covariance at the UE 120 by using option 1, for the one or more first parts of the current slot scheduled in the cell 11, and when no symbol, such as e.g., of symbols 8-14, of one or more second parts of the current slot scheduled in the cell 11 experiences interference from the interfering cell 12, the recommendation comprises to compute covariance at the UE 120 by using option 2 for the one or more second parts of the current slot scheduled in the cell 11.

Example 3, 4, 5. In some other embodiments the recommendation of which one or more out of option 1 and option 2, to use for computing covariance at the UE 120, based on the first scheduling information and the second scheduling information comprises:

when no symbol such as e.g., of symbols 1-7, of one or more third parts of the current slot scheduled in the cell 11 does experience interference of the one or more interfering cells 12 and each symbol such as e.g., of symbols 8-14, of one or more fourth parts of the current slot scheduled in the cell 11 does experience some interference from one or more interfering cells 12, the recommendation comprises to compute covariance at the UE 120 by using option 2, for both the one or more third parts and the one or more fourth parts of the current slot scheduled in the cell 11.

Action 702

The UE 120 further receives from the network node 110, information about a symbol level interference. Symbol level interference when used herein may e.g. mean whether the DMRS symbols are experiencing same interference or not. This information may be needed to know whether to accumulate the DMRS symbols or use as individual.

Action 703

The UE 120 computes a covariance according to the recommendation and based on the information about a symbol level interference.

Action 704

The UE 120 determines receiver weights, such as e.g. MMSE-IRC weights, based on the computed covariance.

Action 705

The UE 120 then detects received DL symbols based on the determined receiver weights.

In this way the receiver weights are formulated which are capable of properly rejecting or restraining interference.

The above embodiments will now be further explained and exemplified below. The embodiments below may be combined with any suitable embodiment above.

Methods according to Option 1 and Option 2 will be described below.

These comprises, an example of computing a covariance mentioned above in Action 703, such as estimating a covariance matrix at the receiver node, i.e. a node that is receiving a signal such as the UE 120.

Further an example will be described how to decide which one or more out of option 1 and option 2, based on the first and the second scheduling information as mentioned above in Action 603. This example comprises how the network node 110 is able to recommend which method that may be suitable for the UE 120 for estimating the covariance matrix.

In the option 1 the UE 120 uses accumulated DMRS for computing covariance at the UE 120. Assume that the received signal in frequency domain is written as:

$$Y = H_1 P_1 x_1 + n + H_2 P_2 x_2 \tag{1}$$

Where, $Y \in C^{N_r \times 1}$ corresponds to a received signal vector, and $H1 \in C^{N_r \times N_t}$ describes an overall channel matrix. A complex zero-mean Gaussian noise vector $n \in C^{N_r \times 1}$ is having covariance $R_n$. An unknown complex data/symbol vector is denoted by $x \in c^{N_L \times 1}$ (having normalized power$E\{xx^H\}=R_x=I$) corresponding to M-QAM (e.g., 64-Quadrature Amplitude Modulation (QAM)) constellation □. A complex precoder $P1 \in c^{N_t \times N_L}$ is selected from a given/known codebook having $N_p$ number of precoders (where, PMI={0,1, . . . $N_p$-1}) for a givenrank≤min{$N_r$, $N_t$}. Let $H2 \in C^{N_r \times N_t}$ describe an overall channel matrix from the other interfering base station, the neighboring network node 112 (providing the interfering cell 12) to the UE 120, which is precoded with $P_2$ and sending data $x_2$ to another UE.

At the receiver, the UE 120 computes the covariance matrix (Rc) based on the DMRS of the serving cells as $$R_c = (Y - H_{est} d) * (Y - H_{est} d)^H \tag{2}$$

Where $H_{est}$ is the estimated channel matrix of the serving cell, d=[d1;d2] is the all accumulated DMRS symbols in the slot. Once the UE 120 computes the covariance matrix, it uses this in computing the MMSE-IRC weights for all the symbols in the slot.

In the Option 2, the UE 120 computes covariance matrix based on individual DMRS, e.g. only on a single DMRS symbol and applies the weights only for a few symbols in the slot. That is, assume that the interference is partially loaded, which is a typical case in 5G with low loading conditions and different services such as URLLC, mini slots etc., then the UE 120 computes covariance estimation on each DMRS and checks the symbols which covariance matrix it has to use for proper computation of receiver weights such as MMSE-IRC weights.

That is $$R_{c1} = (Y - H_{est} d_1) * (Y - H_{est} d_1)^H \tag{3}$$

$$\text{and } R_{c2} = (Y - H_{est} d_2) * (Y - H_{est} d_2)^H \tag{4}$$

Where $H_{est}$ is the estimated channel matrix of the serving cell, d1 is the DMRS symbols in the front-loaded slot, and d2 is the additional DMRS symbol.

It will now be explained how the UE 120 applies the covariance matrix by a few examples:

For Examples 1, 2, 3, 4, and 5 as mentioned above the deciding whether option 1 or option 2 or both shall be used to compute covariance in Action 603, may comprise to identifying whether or not each symbol of the current slot scheduled in the cell 11 experiences interference from the interfering cell 12.

When each symbol of the current slot scheduled in the cell 11 experiences interference from the interfering cell 12, the network node decides to compute covariance at the UE 120 by using option 1, and when each symbol of the current slot scheduled in the cell 11 does not experience interference from the interfering cell 12, the network node 110 decides to compute covariance at the UE 120 by using option 2.

In FIGS. 8-12, cell 11 is referred to as "serving cell", and the interfering cell 12 is referred to as "interfering cell", and DMRS is referred to as DM-RS.

Further, in the FIGS. 8-12, the control channel is represented by diagonal brick paving patterned boxes, PDSCH is represented by white boxes with black dotted patterns, front loaded DMRS is represented by black boxes with white dotted patterns, and the one or more additional DMRS are represented by horizontal brick paving patterned boxes and shingle patterned boxes and wave patterned boxes.

Further, in FIGS. 8-12, the x-axis is the symbol number in time units and the y-axis is the sub carrier index in frequency domain.

Example 1

Figure 8:
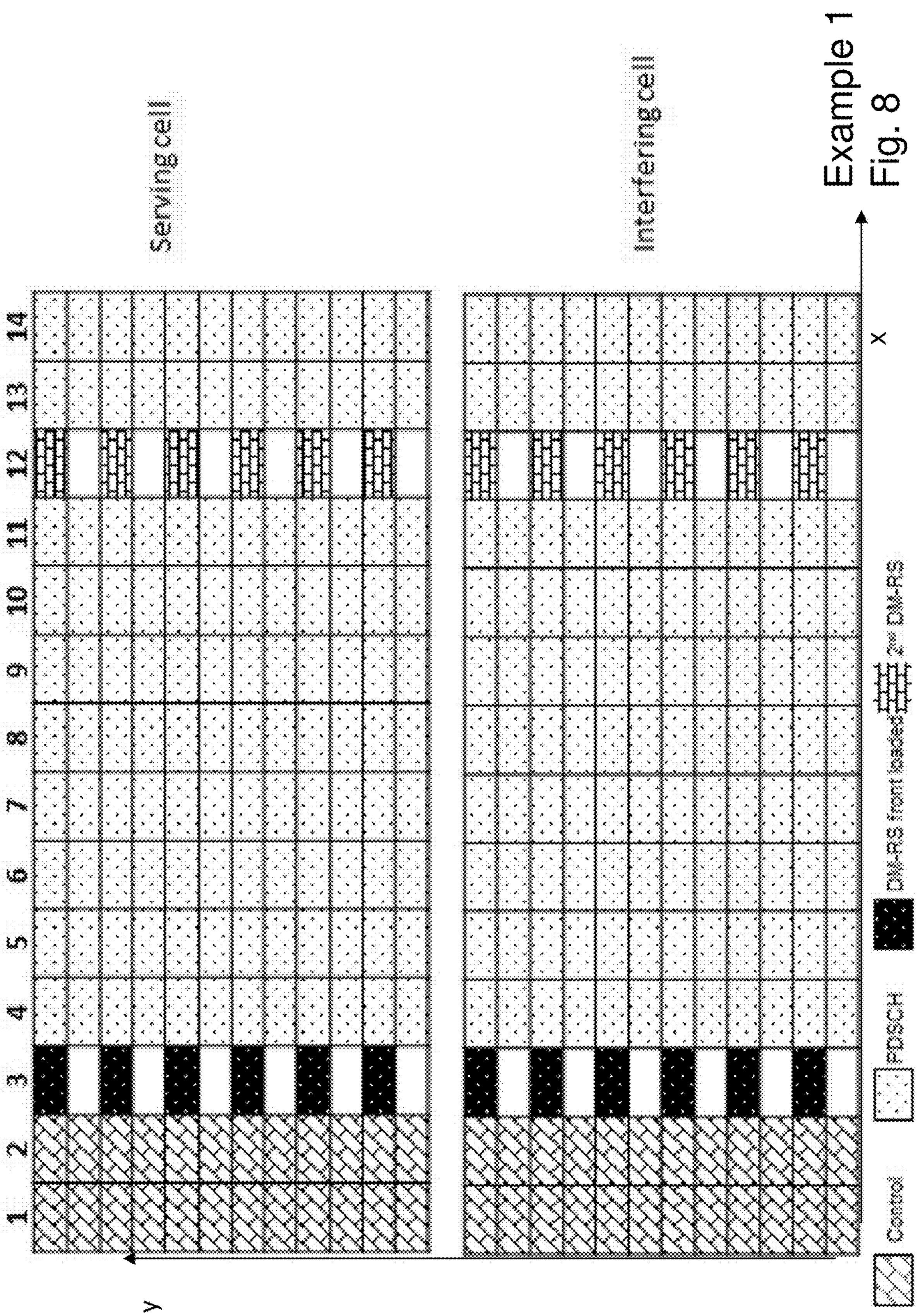
FIG. 8 is a schematic block diagram illustrating an example of embodiments herein.

In Example 1 as shown in FIG. 8, the interfering cell 12 is completely loaded, that is full interference from the interfering cell 12 in cell 11. The network node 110 then decides that option 1 shall be used and sends a recommendation to the UE 120 to use option 1.

In this case, the UE 120 accumulates the DMRS symbols and computes the covariance according to the option 1 method and computes the receiver weights such as the MMSE-IRC weights, for all the symbols in the slot.

Example 2

Figure 9:
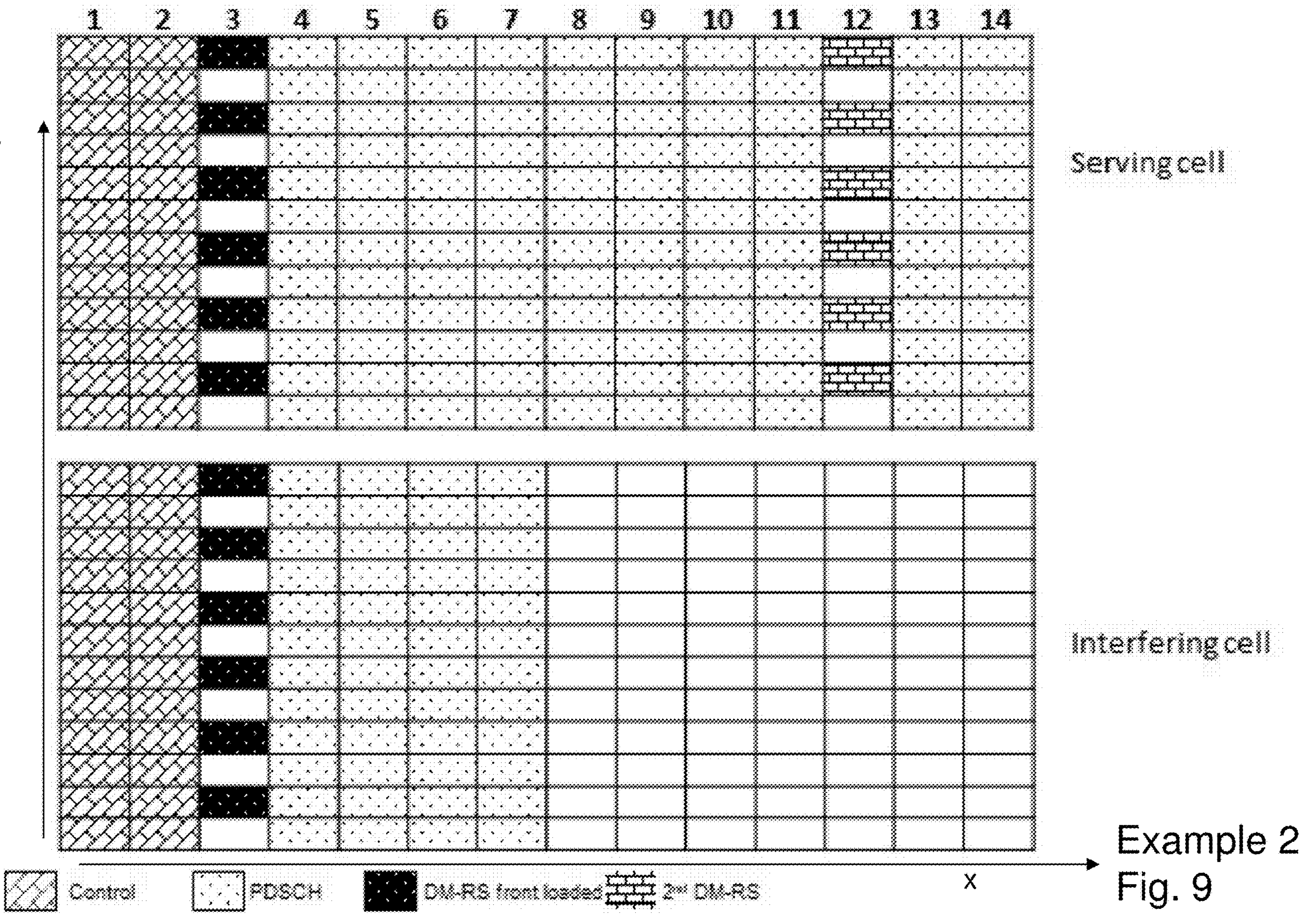
FIG. 9 is a schematic block diagram illustrating an example of embodiments herein.

In Example 2 depicted in FIG. 9, the resource mapping involves that the interfering cell 12 is partially loaded in the slot comprising symbols 1-7. In this case, it can be seen from FIG. 9 that the front loaded DMRS and the additional DMRS does not experience the same interference level. The symbols 1-7 in the serving cell 11 experiences interference from the interfering cell 12, while the symbols 8-14 does not experience any interference from the interfering cell 12.

In this example, the network node 110 identifies that each symbol 1-7 of one or more first parts of the current slot scheduled in the cell 11 experiences interference from the interfering cell 12. The network node 110 then decides to compute covariance at the UE 120 by using option 1, for the one or more first parts of the current slot scheduled in the cell 11.

Further, the network node 110 identifies that no symbol 8-14 of one or more second parts of the current slot scheduled in the cell 11 does experience interference from the interfering cell 12 and decides to compute covariance at the UE 120 by using option 2 for the one or more second parts of the current slot scheduled in the cell 11.

In this case the network node 110 decides that both option 1 and option 2 shall be used and sends a recommendation to the UE 120 to use option 1 and option 2. Thus, in this case, the UE 120 computes two covariance matrices, a first covariance matrix according to option 1 and a second covariance matrix according to option 2. The UE 120 applies the first covariance matrix for formulating the MMSE-IRC weights for symbols 1-7, while the UE 120 uses the second covariance matrix for formulating the MMSE-IRC weights for symbols 8-14.

Example 3

Figure 10:
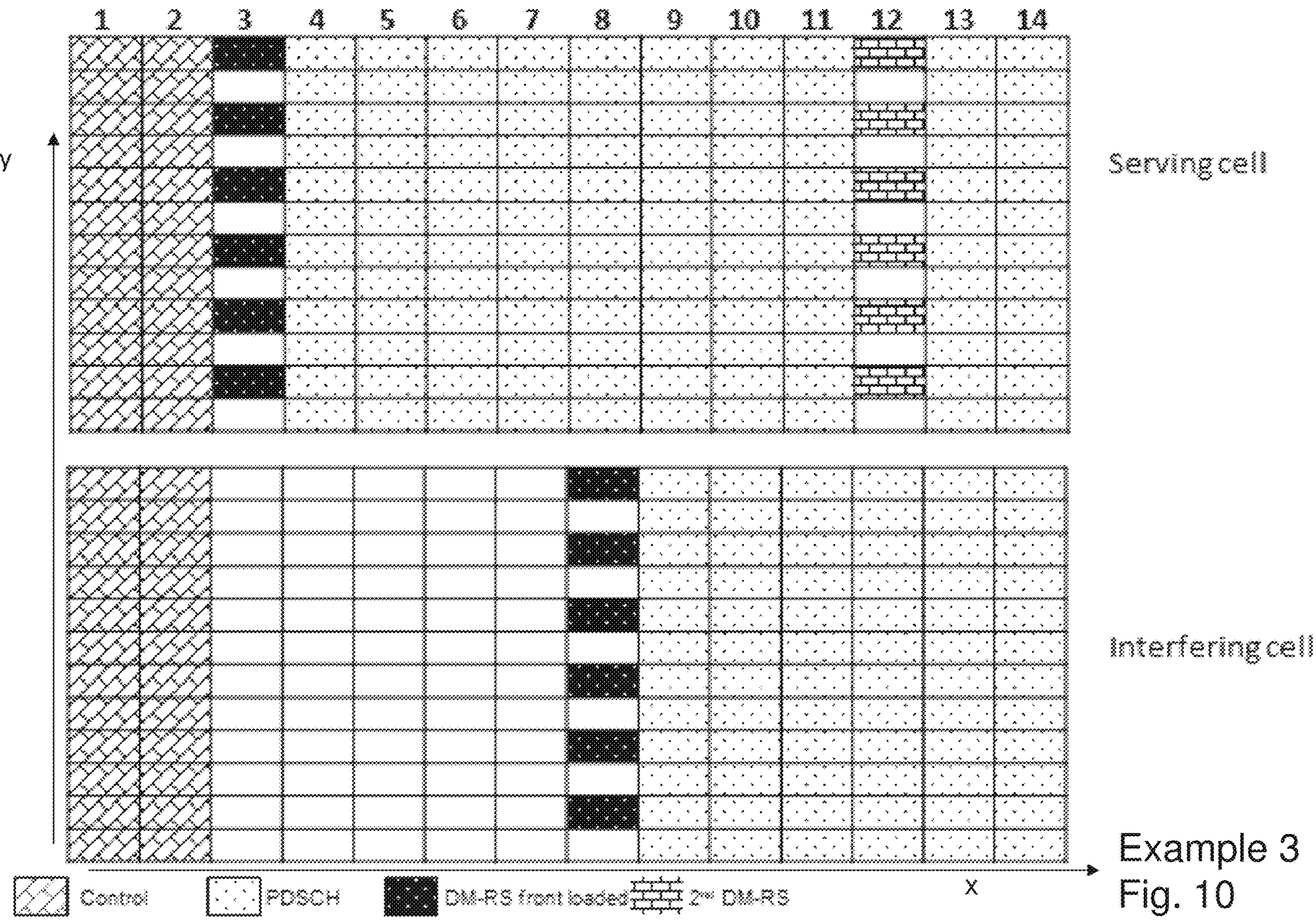
FIG. 10 is a schematic block diagram illustrating an example of embodiments herein.

In Example 3 depicted in FIG. 10 the resource mapping is according to the following where the interfering cell 12 is partially loaded in the slot, that is symbols 8-14. In this case, it can be seen from FIG. 10 that the front loaded DMRS and the additional DMRS does not experience the same interference level. The symbols 1-7 in the serving cell 11 does not experiences interference from the interfering cell 12, while the symbols 8-14 experience any interference from the interfering cell.

In this example, the network node 110 identifies that no symbol 1-7 of one or more third parts of the current slot scheduled in the cell 11 does experience interference of the one or more interfering cells 12 and identifies that each symbol 8-14 of one or more fourth parts of the current slot scheduled in the cell 11 does experience some interference from one or more interfering cells 12. The network node 110 decides to compute covariance at the UE 120 by using option 2, for both the one or more third parts and the one or more fourth parts of the current slot scheduled in the cell 11 and sends a recommendation to the UE 120 to use option 2.

Hence in this case, the UE 120 computes the two covariance matrices according to the option 2 method and applies the first covariance matrix for formulating the MMSE-IRC weights for symbols 1-7, while the UE 120 uses the second covariance matrix for formulating the MMSE-IRC weights for symbols 8-14.

Note that the specification allows more than one additional DMRS and is therefore referred to as one or more additional DMRS, and multiple additional DMRS in several places herein. This is shown in the below Table 3. Table 3 shows that DMRS positions for a given slot length, where I0 indicates the first DMRS position, I0,7 indicates the first DMRS is at I0, and the additional DMRS is at 7 etc.

In the case of one front loaded and two additional (1+2) DMRS embodiments herein applies as the network node 110 or the UE 120 checks whether the one or more additional DMRS experience any interference from the interfering cell 12 or not. In other words, the network node 110 identifies whether or not each symbol of the current slot scheduled in the cell 11 experiences interference from the interfering cell 12. And as mentioned above:

When each symbol of the multiple additional DMRS of the current slot scheduled in the cell 11 experiences interference from the interfering cell 12, the network node decides to compute covariance at the UE 120 by using option 1, and when each symbol of the multiple additional DMRS of the current slot scheduled in the cell 11 does not experience interference from the interfering cell 12, the network node 110 decides to compute covariance at the UE 120 by using option 2.

If interference is experienced, then the UE 120 will receive a recommendation from the network node 110 to use option 1 and will then accumulate DMRS which experiences the same interference and compute the covariance matrix according to option 1. This multiple additional DMRS case will be explained by few examples.

TABLE 3

| | DM-RS positions $\bar{l}$ | | | | | | | |
|---|---|---|---|---|---|---|---|---|
| Duration in | PDSCH mapping type A dmrs-AdditionalPosition | | | | PDSCH mapping type B dmrs-AdditionalPosition | | | |
| symbols | 0 | 1 | 2 | 3 | 0 | 1 | 2 | 3 |
| 2 | — | — | — | — | $l_0$ | $l_0$ | | |
| 3 | $l_0$ | $l_0$ | $l_0$ | $l_0$ | — | — | | |
| 4 | $l_0$ | $l_0$ | $l_0$ | $l_0$ | $l_0$ | $l_0$ | | |

TABLE 3-continued

| Duration in | DM-RS positions $\bar{l}$ | | | | | | | |
|---|---|---|---|---|---|---|---|---|
| | PDSCH mapping type A dmrs-AdditionalPosition | | | | PDSCH mapping type B dmrs-AdditionalPosition | | | |
| symbols | 0 | 1 | 2 | 3 | 0 | 1 | 2 | 3 |
| 6 | $l_0$ | $l_0$ | $l_0$ | $l_0$ | — | — | | |
| 6 | $l_0$ | $l_0$ | $l_0$ | $l_0$ | $l_0$ | $l_0$, 4 | | |
| 7 | $l_0$ | $l_0$ | $l_0$ | $l_0$ | $l_0$ | $l_0$, 4 | | |
| 8 | $l_0$ | $l_0$, 7 | $l_0$, 7 | $l_0$, 7 | — | — | | |
| 9 | $l_0$ | $l_0$, 7 | $l_0$, 7 | $l_0$, 7 | — | — | | |
| 10 | $l_0$ | $l_0$, 9 | $l_0$, 6, 9 | $l_0$, 6, 9 | — | — | | |
| 11 | $l_0$ | $l_0$, 9 | $l_0$, 6, 9 | $l_0$, 6, 9 | — | — | | |
| 12 | $l_0$ | $l_0$, 9 | $l_0$, 6, 9 | $l_0$, 5, 8, 11 | — | — | | |
| 13 | $l_0$ | $l_0$, 11 | $l_0$, 7, 11 | $l_0$, 5, 8, 11 | — | — | | |
| 14 | $l_0$ | $l_0$, 11 | $l_0$, 7, 11 | $l_0$, 5, 8, 11 | — | — | | |

Example 4

Figure 11:
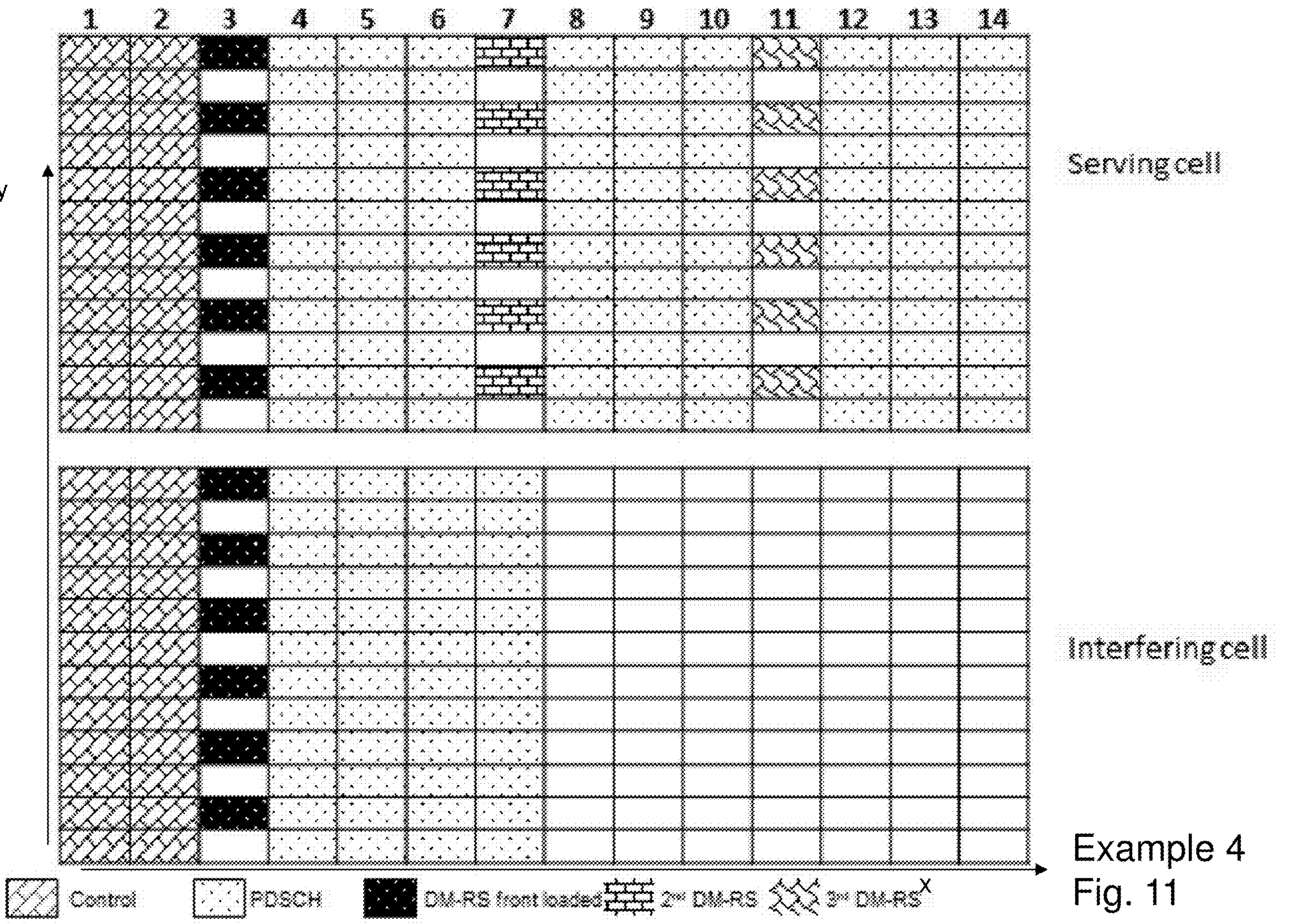
FIG. 11 is a schematic block diagram illustrating an example of embodiments herein.

In Example 4 depicted in FIG. 11, the resource mapping is according to the following where the interfering cell is partially loaded in the slot, that is symbols 1-7, where the network node 110 in its serving cell 11 uses one front loaded and two additional (1+2) DMRS. The network node 110 identifies whether or not each symbol of the current slot scheduled in the cell 11 experiences interference from the interfering cell 12.

In this case, it can be seen that the front loaded DMRS and the additional DMRS at symbol 7 experiences the interference while the additional DMRS at symbol 11 does not experience the same interference level.

So, in this example, the network node 110 identifies that each symbol 1-7, of a part of the current slot scheduled in the cell 11 does experience interference of the interfering cell 12, and identifies that the symbols 8-14 of another part of the current slot scheduled in the cell 11 does not experience any interference from interfering cell 12.

The network node 110 decides to compute covariance at the UE 120 by using option 1, for the part experiencing interference and option 2 for the other part and sends a recommendation to the UE 120 to use option 1 and option 2.

Hence in this case, the UE 120 computes the first covariance matrix according to option 1 by accumulating the DMRS in symbols 3 and 7 and applies the first covariance matrix for formulating the weights such as the MMSE-IRC weights for symbols 1-7. The UE 120 computes a second covariance matrix according to option 2 based on additional DMRS on symbol 11 for formulating the weights such as the MMSE-IRC weights for symbols 8-14.

Example 5

Figure 12:
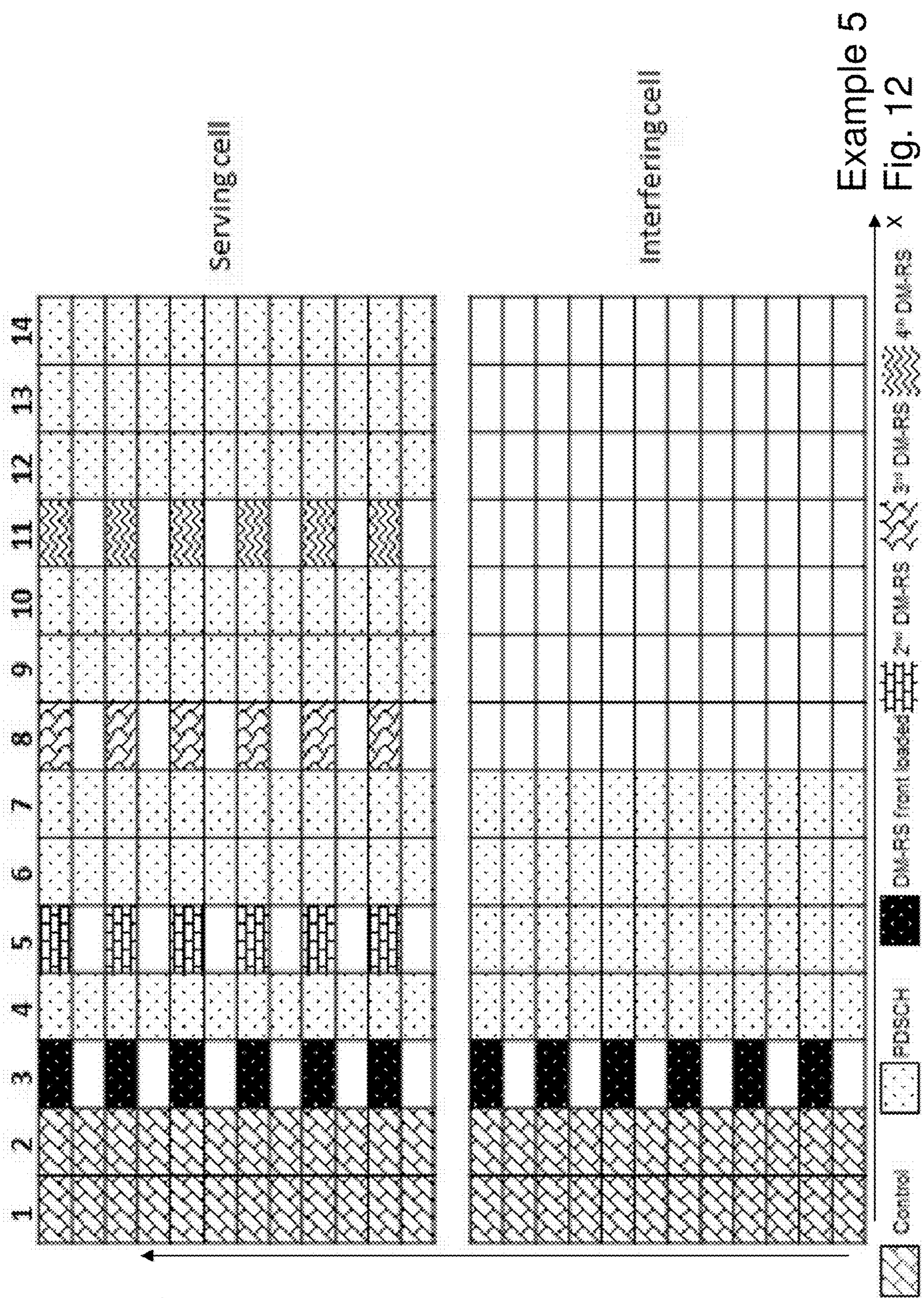
FIG. 12 is a schematic block diagram illustrating an example of embodiments herein.

In Example 5 depicted in FIG. 12 the resource mapping is according to the following where the interfering cell 12 is partially loaded in the slot, that is symbols 1-7, where the serving cell uses one front loaded and three additional (1+3) DMRS.

In this case, it can be seen that the front loaded DMRS and the additional DMRS at symbol 5 experiences the interference while the additional DMRS at symbol 8 and 11 does not experience the same interference level as that of 3 and 5 symbols.

So, in this example, the network node 110 identifies that each symbol 1-7, i.e. a part of the current slot scheduled in the cell 11 does experience interference of the interfering cell 12, and identifies that the symbols 8-14 of another part of the current slot scheduled in the cell 11 does not experience any interference from interfering cell 12.

The network node 110 decides to compute covariance at the UE 120 by using option 1, for the part experiencing interference and option 2 for the other part and sends a recommendation to the UE 120 to use option 1 and option 2.

Hence in this case, the UE 120 computes the first covariance matrix according to option 1, by accumulating the DMRS in symbols 3 and 5, and applies the first covariance matrix for formulating the MMSE-IRC weights for symbols 1-7. The UE 120 uses the second covariance matrix according to option 2, based on additional DMRS on symbols 8 and 11 for formulating the MMSE-IRC weights for symbols 8-14.

According to some embodiments herein, the UE (120) need to know whether each symbol is affected by the other cell interference or not. In general, the network node 110, e.g. with 3 sectors in the cell 11, and with a scheduler co-ordination between them may identify whether each symbol of serving cell 11 experiences the interference or not. This information is then communicated to the UE via physical channel e.g. as part of a downlink control channel.

In some embodiments the network node 110 sends a bit map of each symbol and set that to 1, to inform or recommend to the UE 110 whether or not the neighboring network node 112 providing the interfering cell 12, has scheduled data and/or DMRS on that symbol. That is e.g. a bit map of 14 or 12, if 2 symbols are reserved for control channel and no data multiplexing on these symbols, symbols are needed to function efficiently.

In some other embodiments, the network node 110 may indicate a cell—Identity (ID) of the neighboring network node 112 and a Cell Radio Network Temporary Identifier (C-RNTI) of another scheduled UE in the interfering cell 12 to the UE 12. Once the UE 120 receives this information, it will decode the other PDCCH of the cell 11 and may then identify whether each symbol is interfered by the interfering cell 12 or not.

To perform the method actions above, the network node 110 is configured to assist the UE 120 in detecting DL symbols to be received by the UE 120 in the wireless communications network 100. The symbols are adapted to comprise front loaded DMRS and one or more additional DMRS. The network node 110 is adapted to serve the UE 120 in the cell 11. The network node 110 may comprise an arrangement depicted in FIGS. 13*a* and 13*b*.

The network node 110 may comprise an input and output interface 1300 configured to communicate with UEs such as e.g. the UE 120. The input and output interface 1300 may comprise a wireless receiver (not shown) and a wireless transmitter (not shown).

The network node 110 may further be configured to, e.g. by means of an obtaining unit 1310 in the network node 110, obtain a first scheduling information about the front loaded DMRS and the one or more additional DMRS in a current slot scheduled in the cell 11.

The network node 110 may further be configured to, e.g. by means of the obtaining unit 1310 in the network node 110, obtain a second scheduling information about empty symbols in the current slot from an interfering cell 12, The network node 110 may further be configured to, e.g. by means of a deciding unit 1320 in the network node 110, decide which one or more out of option 1 and option 2, to use for computing covariance at the UE 120, based on the first scheduling information and the second scheduling information, wherein option 1 is adapted to comprise accumulated DMRS and option 2 is adapted to comprise individual DMRS.

The network node 110 may further be configured to, e.g. by means of the deciding unit 1320 in the network node 110, decide which one or more out of option 1 and option 2, to use for computing covariance at the UE 120 based on the first scheduling information and the second scheduling information by: identifying whether or not each symbol of the current slot scheduled in the cell 11 experiences interference or not from the interfering cell 12, and when each symbol of the current slot scheduled in the cell 11 experiences interference from the interfering cell 12, decide to compute covariance at the UE 120 by using option 1, and when each symbol of the current slot scheduled in the cell 11 does not experience interference from the interfering cell 12, decide to compute covariance at the UE 120 by using option 2.

The network node 110 may further be configured to, e.g. by means of the deciding unit 1320 in the network node 110, decide which one or more out of option 1 and option 2 to use for computing covariance at the UE 120 based on the first scheduling information and the second scheduling information by:

identifying that each symbol 1-7 of one or more first parts of the current slot scheduled in the cell 11 experiences interference from the interfering cell 12, and decide to compute covariance at the UE 120 by using option 1, for the one or more first parts of the current slot scheduled in the cell 11, and identifying that no symbol 8-14 of one or more second parts of the current slot scheduled in the cell 11 does experience interference from the interfering cell 12, and decide to compute covariance at the UE 120 by using option 2 for the one or more second parts of the current slot scheduled in the cell 11.

The network node 110 may further be configured to, e.g. by means of the deciding unit 1320 in the network node 110, to decide which one or more out of option 1 and option 2 to use for computing covariance at the UE 120 based on the first scheduling information and the second scheduling information by:

identifying that no symbol 1-7 of one or more third parts of the current slot scheduled in the cell 11 does experience interference of the one or more interfering cells 12 and identifying that each symbol 8-14 of one or more fourth parts of the current slot scheduled in the cell 11 does experience some interference from one or more interfering cells 12, and decide to compute covariance at the UE 120 by using option 2, for both the one or more third parts and the one or more fourth parts of the current slot scheduled in the cell 11.

The network node 110 may further be configured to, e.g. by means of a sending unit 1330 in the network node 110, send an indication to the UE 120, which indication is adapted to indicate a recommendation of which one or more out of option 1 and option 2, to use for computing covariance at the UE 120, for detecting DL symbols.

Figure 13A:
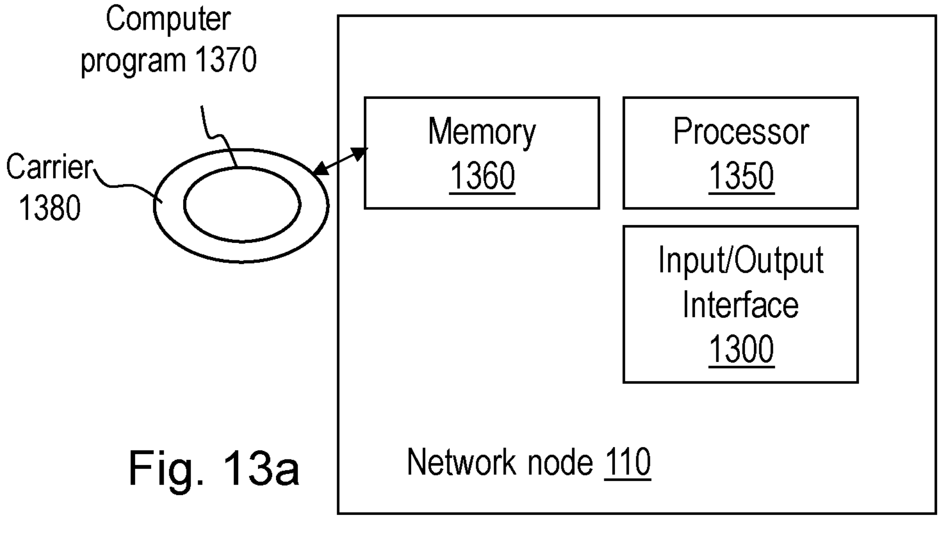
FIG. 13*a-b* are schematic block diagrams illustrating embodiments of a network node.
Figure 13B:
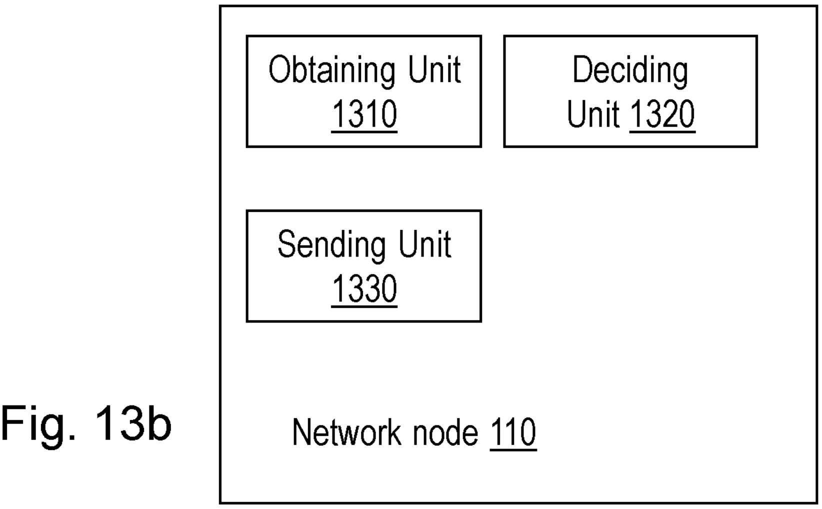

The embodiments herein may be implemented through a respective processor or one or more processors, such as the processor 1350 of a processing circuitry in the network node 110 depicted in FIG. 13*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1360 comprising one or more memory units. The memory 1360 comprises instructions executable by the processor in the network node 110. The memory 1360 is arranged to be used to store e.g. information, indications, symbols, data, configurations, and applications to perform the methods herein when being executed in the network node 110.

In some embodiments, a computer program 1370 comprises instructions, which when executed by the respective at least one processor 1360, cause the at least one processor of the network node 110 to perform the actions above.

In some embodiments, a respective carrier 1380 comprises the respective computer program 870, wherein the carrier 1380 is one of an electronic signal, an optical signal, an electromagnetic signal, a magnetic signal, an electric signal, a radio signal, a microwave signal, or a computer-readable storage medium.

To perform the method actions above, the UE 120 is configured to detect received DL symbols to be received by the UE 120 in the wireless communications network 100. The received symbols are adapted to comprise front loaded DMRS and one or more additional DMRS. The network node 110 is adapted to serve the UE 120 in the cell 11. The UE 120 may comprise an arrangement depicted in FIGS. 14*a* and 14*b*.

The UE 120 may comprise an input and output interface 1400 configured to communicate with network nodes as the network node 110. The input and output interface 1400 may comprise a wireless receiver not shown and a wireless transmitter not shown.

The UE 120 may further be configured to, e.g. by means of a receiving unit 1410 in the network node 110, receive an indication from the network node 110, which indication is adapted to indicate a recommendation of which one or more out of option 1 and option 2, to use for computing covariance at the UE 120, wherein option 1 is adapted to comprise accumulated DMRS and option 2 is adapted to comprise individual DMRS. The UE 120 may further be configured to, e.g. by means of the receiving unit 1410 in the network node 110, receive from the network node 110, information about a symbol level interference.

The UE 120 may further be configured to, e.g. by means of a computing unit 1420 in the network node 110, compute a covariance according to the recommendation and based on the information about a symbol level interference.

The UE 120 may further be configured to, e.g. by means of a determining unit 1430 in the network node 110, determine receiver weights based on the computed covariance.

The UE 120 may further be configured to, e.g. by means of a detecting unit 1440 in the network node 110, detect received DL symbols based on the determined receiver weights.

In some embodiments, the recommendation is adapted to be based on a first scheduling information about the front loaded DMRS and the one or more additional DMRS in a current slot scheduled in the cell 11, and a second scheduling information about empty symbols in the current slot from an interfering cell 12.

In some embodiments, the recommendation of which one or more out of option 1 and option 2, to use for computing covariance at the UE 120, is adapted to be based on whether or not each symbol of the current slot scheduled in the cell 11 experiences interference or not from an interfering cell 12, and when each symbol of the current slot scheduled in the cell 11 experiences interference from the interfering cell 12, the indication is adapted to recommend to compute covariance at the UE 120 by using option 1, and when each symbol of the current slot scheduled in the cell 11 does not experience interference from the interfering cell 12, the indication is adapted to recommend to compute covariance at the UE 120 by using option 2.

In some embodiments, the recommendation of which one or more out of option 1 and option 2, to use for computing covariance at the UE 120, based on the first scheduling information and the second scheduling information is adapted to comprise:

when each symbol 1-7 of one or more first parts of the current slot scheduled in the cell 11 experiences interference from the interfering cell 12, the recommendation is adapted to comprise to compute covariance at the UE 120 by using option 1 for the one or more first parts of the current slot scheduled in the cell 11, and when no symbol 8-14 of one or more second parts of the current slot scheduled in the cell 11 experiences interference from the interfering cell 12, the recommendation is adapted to comprise to compute covariance at the UE 120 by using option 2 for the one or more second parts of the current slot scheduled in the cell 11.

In some embodiments, the recommendation of which one or more out of option 1 and option 2, to use for computing covariance at the UE 120, based on the first scheduling information and the second scheduling information is adapted to comprise:

when no symbol 1-7 of one or more third parts of the current slot scheduled in the cell 11 does experience interference of the one or more interfering cells 12 and each symbol 8-14 of one or more fourth parts of the current slot scheduled in the cell 11 does experience some interference from one or more interfering cells 12, the recommendation is adapted to comprise to compute covariance at the UE 120 by using option 2, for both the one or more third parts and the one or more fourth parts of the current slot scheduled in the cell 11.

Figures 14A, 14B:
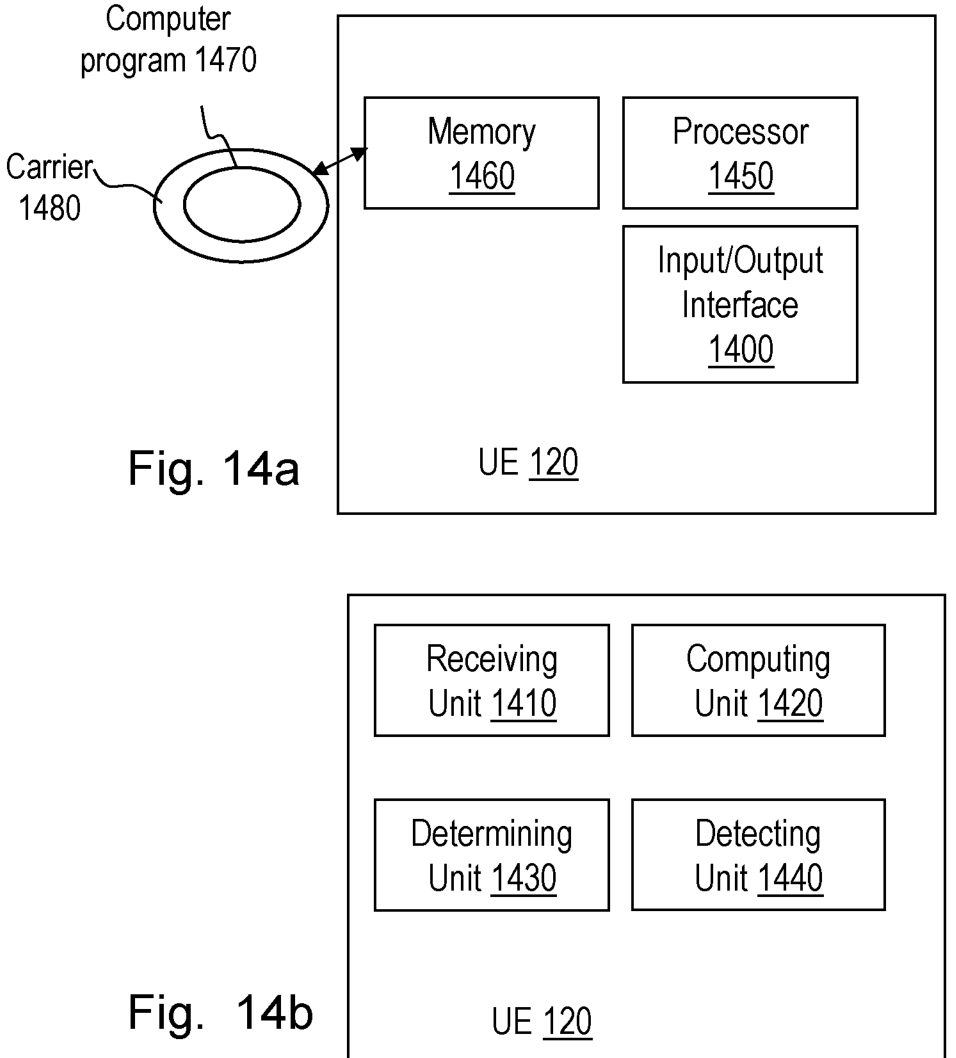
FIG. 14*a-b* are schematic block diagrams illustrating embodiments of a UE.

The embodiments herein may be implemented through a respective processor or one or more processors, such as the processor 1450 of a processing circuitry in the UE 120 depicted in FIG. 14*a*, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1460 comprising one or more memory units. The memory 1460 comprises instructions executable by the processor in the UE 120. The memory 1460 is arranged to be used to store e.g. information, indications, symbols data, configurations, and applications to perform the methods herein when being executed in the UE 120.

In some embodiments, a computer program 1470 comprises instructions, which when executed by the respective at least one processor 1450, cause the at least one processor of the UE 120 to perform the actions above.

In some embodiments, a respective carrier 1480 comprises the respective computer program 1470, wherein the carrier 1480 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g., stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 15:
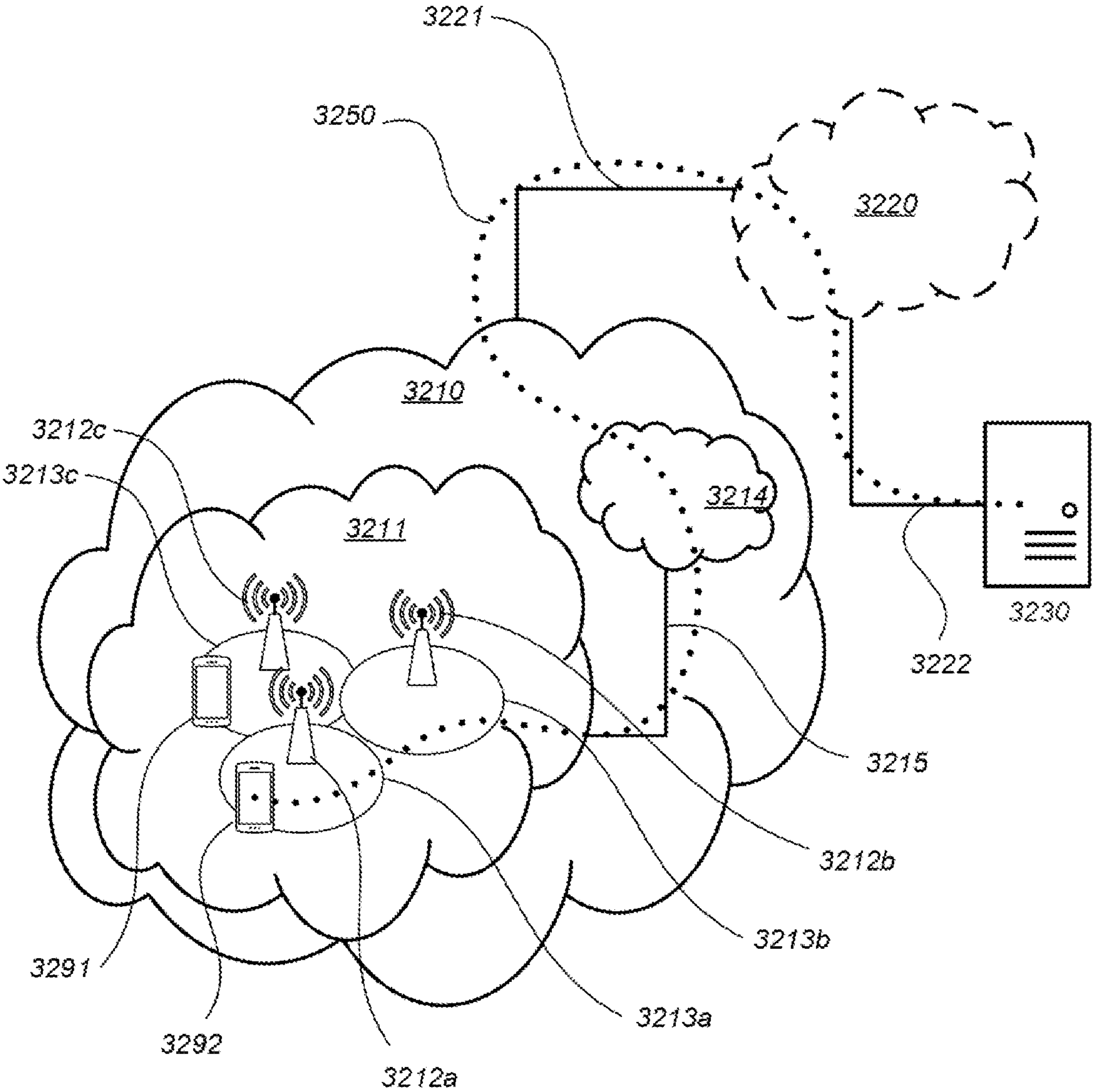
FIG. 15 schematically illustrates a telecommunication network connected via an intermediate network to a host computer.

With reference to FIG. 15, in accordance with an embodiment, a communication system includes a telecommunication network 3210, such as a 3GPP-type cellular network, e.g. the wireless communications network 100, which comprises an access network 3211, such as a radio access network, and a core network 3214. The access network 3211 comprises a plurality of base stations 3212*a*, 3212*b*, 3212*c*, e.g. the network node 110, such as AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291, e.g. the UE 120, located in coverage area 3213*c* is configured to wirelessly connect to, or be paged by, the corresponding base station 3212*c*. A second UE 3292 e.g. the UE 122, such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 15 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 16. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 16 may be identical to the host computer 3230, one of the base stations 3212*a*, 3212*b*, 3212*c* and one of the UEs 3291, 3292 of FIG. 15, respectively. This is to say, the inner workings of these entities may be as shown in FIG. 16 and independently, the surrounding network topology may be that of FIG. 15.

Figure 16:
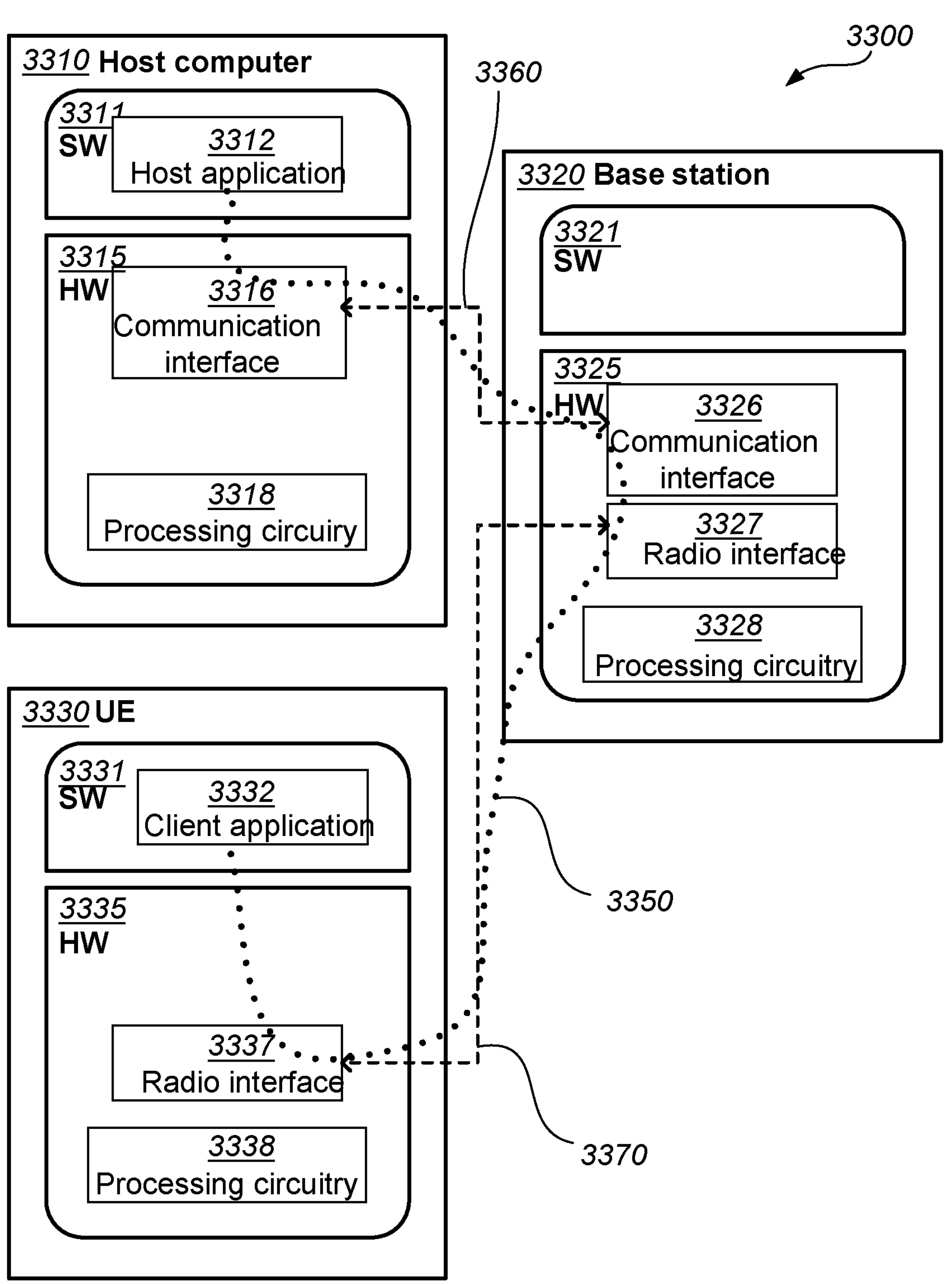
FIG. 16 is a generalized block diagram of a host computer communicating via a base station with a user equipment over a partially wireless connection.

In FIG. 16, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption and thereby provide benefits such as corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 17, 18:
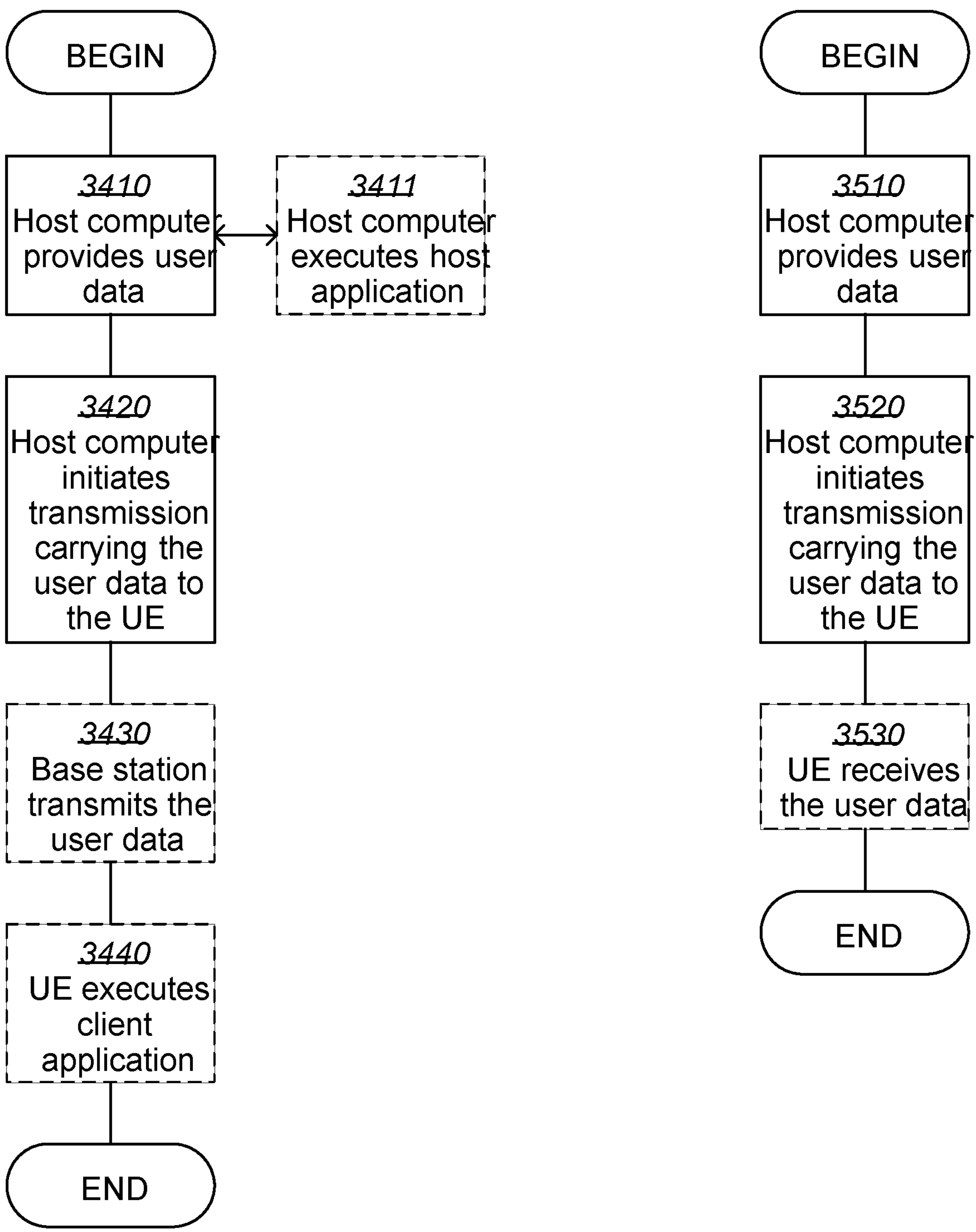
FIGS. 17-20 are flowcharts illustrating methods implemented in a communication system including a host computer, a base station and a user equipment.

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 15 and FIG. 16. For simplicity of the present disclosure, only drawing references to FIG. 17 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 15 and FIG. 16. For simplicity of the present disclosure, only drawing references to FIG. 18 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 19, 20:
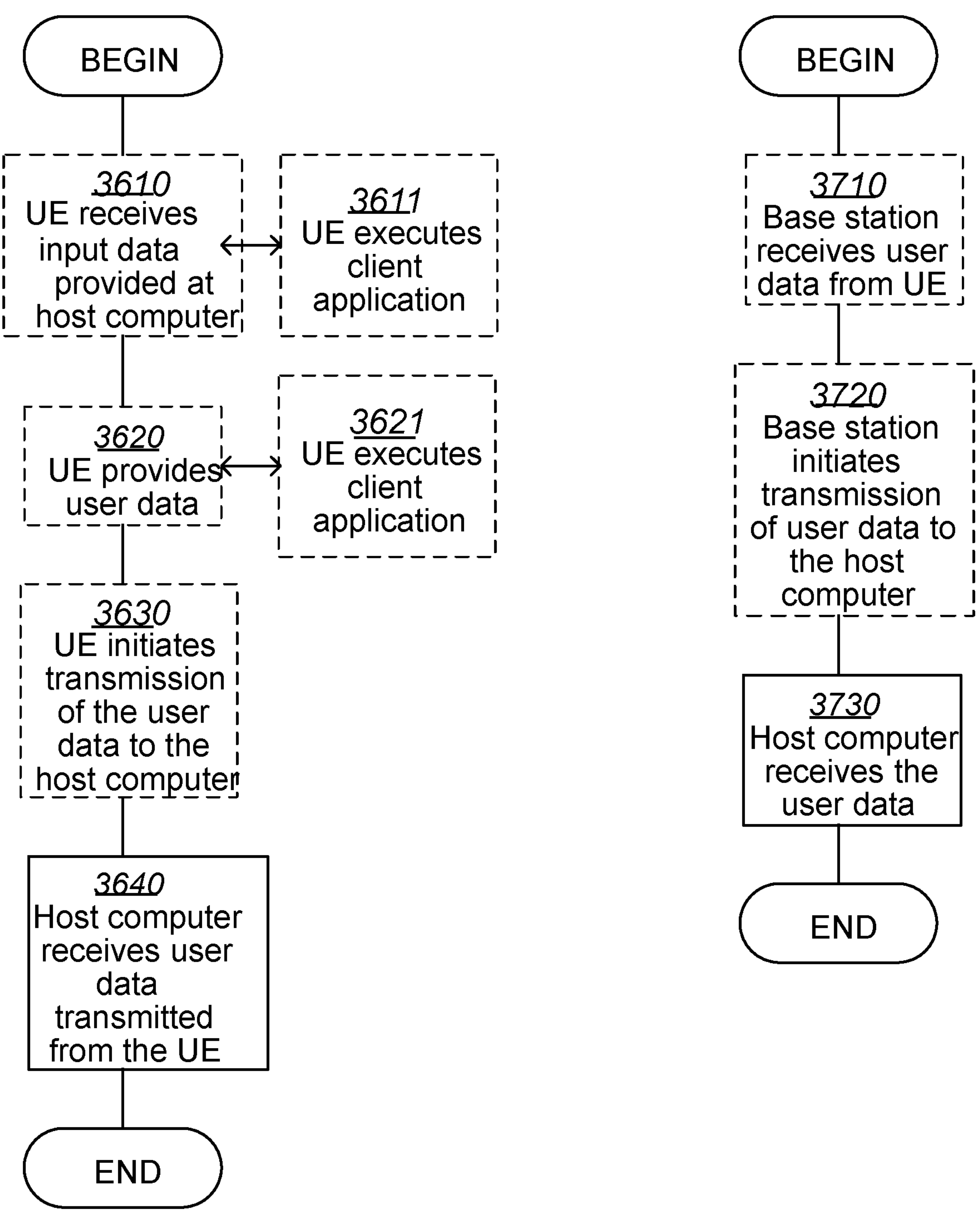

FIG. 19 is a flowchart illustrating a method implemented in a communication system, in accordance with one embodiment. The communication system includes a host computer, a base station such as an AP STA, and a UE such as a Non-AP STA which may be those described with reference to FIG. 15 and FIG. 16. For simplicity of the present disclosure, only drawing references to FIG. 19 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 15 and FIG. 16. For simplicity of the present disclosure, only drawing references to FIG. 20 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

MIMO Multiple input multiple output
NR New Radio
Tx Transmitter
HSDPA High Speed Downlink Packet Access
DCI Downlink control Index
HARQ Hybrid automatic repeat request
CRC Cyclic redundancy check
NAK non-acknowledgement
ACK acknowledgement
UE User Equipment
CQI Channel quality information
MMSE Minimum Mean Square Error
ML Maximum Likelihood
MAP Maximum Aposteriori Probability
TTI Transmit Time Interval
PCI Precoding control index
BS Base Station
D2D Device-to-Device
HD Half Duplex
M2M Machine-To-Machine
MTC Machine-Type Communication
UE User Equipment
eNB Evolved Node B, base station
E-UTRAN Evolved universal terrestrial radio access network
E-UTRA Evolved universal terrestrial radio access
E-UTRA FDD E-UTRA frequency division duplex
E-UTRA TDD E-UTRA time division duplex
LTE Long term evolution
RAT Radio Access Technology
RRC Radio resource control
TDD Time division duplex
BSC Base station Controller
HSPA High Speed Packet Access GSM Global system for mobile communication
UTRA Universal terrestrial radio access
UTRA FDD UTRA frequency division duplex
UTRA TDD UTRA time division duplex
WLAN Wireless Local Area Network
GERAN GSM EDGE Radio Access Network
EDGE Enhanced Data rates for GSM Evolution
CDMA2000 Code division multiple access 2000
HRPD High rate packet data
DL Downlink
PDCCH Physical Downlink Control Channel
PCFICH Physical Control format Indicator
PDSCH Physical Downlink Shared Channel
PHICH Physical Hybrid ARQ Indicator Channel
RE Resource Element
RB Resource Block
RS Reference signal
SINR Signal-to-Interference Ratio

The invention claimed is:

1. A method performed by a network node for assisting a User Equipment (UE) in detecting Downlink (DL) symbols to be received by the UE in a wireless communications network, which DL symbols comprise front loaded Demodulation Reference Signals (DMRS) and one or more additional DMRS, and which network node serves the UE in a cell, the method comprising:

obtaining a first scheduling information about the front loaded DMRS and the one or more additional DMRS in a current slot scheduled in the cell, wherein the first scheduling information is based on channel state information reported by the UE;

obtaining a second scheduling information about empty symbols in the current slot from an interfering cell, wherein the second scheduling information is received from a neighbouring network node;

deciding which one or more out of option 1 and option 2 to use for computing covariance at the UE, based on the first scheduling information and the second scheduling information, wherein option 1 comprises accumulated DMRS and option 2 comprises individual DMRS, and wherein the deciding of which one or more out of option 1 and option 2 to use for computing covariance at the UE, based on the first scheduling information and the second scheduling information, comprises identifying whether or not each symbol of the current slot scheduled in the cell experiences interference or not from the interfering cell, in which:

when each symbol of the current slot scheduled in the cell experiences interference from the interfering cell, deciding to compute covariance at the UE by using option 1; and when each symbol of the current slot scheduled in the cell does not experience interference from the interfering cell, deciding to compute covariance at the UE by using option 2; and sending an indication to the UE, which indication indicates a recommendation based on the deciding which one or more out of option 1 and option 2, to use for computing covariance at the UE for detecting the DL symbols.

2. The method according to claim 1, wherein the deciding which one or more out of option 1 and option 2 to use for computing covariance at the UE, based on the first scheduling information and the second scheduling information comprises:

identifying that each symbol of one or more first parts of the current slot scheduled in the cell experiences interference from the interfering cell and deciding to compute covariance at the UE by using option 1 for the one or more first parts of the current slot scheduled in the cell; and identifying that no symbol of one or more second parts of the current slot scheduled in the cell does experience interference from the interfering cell and deciding to compute covariance at the UE by using option 2 for the one or more second parts of the current slot scheduled in the cell.

3. The method according to claim 1, wherein the deciding which one or more out of option 1 and option 2 to use for computing covariance at the UE, based on the first scheduling information and the second scheduling information comprises:

identifying that no symbol of one or more third parts of the current slot scheduled in the cell does experience interference of the one or more interfering cells and identifying that each symbol of one or more fourth parts of the current slot scheduled in the cell does experience some interference from one or more interfering cells; and deciding to compute covariance at the UE by using option 2, for both the one or more third parts and the one or more fourth parts of the current slot scheduled in the cell.

4. A method performed by a User Equipment (UE) for detecting received Downlink (DL) symbols to be received by the UE in a wireless communications network, which DL symbols comprise front loaded Demodulation Reference Signals (DMRS) and one or more additional DMRS, and wherein a network node serves the UE in a cell, the method comprising:

receiving an indication from the network node, which indication indicates a recommendation of which one or more out of option 1 and option 2 to use for computing covariance at the UE, wherein option 1 comprises accumulated DMRS and option 2 comprises individual DMRS, and wherein the recommendation of which one or more out of option 1 and option 2 to use for computing covariance at the UE, is based on whether or not each symbol of a current slot scheduled in the cell experiences interference or not from an interfering cell, in which:

when each symbol of the current slot scheduled in the cell experiences interference from the interfering cell, the indication recommends to compute covariance at the UE by using option 1; and when each symbol of the current slot scheduled in the cell does not experience interference from the interfering cell, the indication recommends to compute covariance at the UE by using option 2;

receiving, from the network node, information about a symbol level interference;

computing a covariance according to the recommendation and based on the information about a symbol level interference;

determining receiver weights based on the computed covariance; and detecting the DL symbols based on the determined receiver weights.

5. The method according to claim 4, wherein the recommendation is based on a first scheduling information about the front loaded DMRS and the one or more additional DMRS in the current slot scheduled in the cell, and a second scheduling information about empty symbols in the current slot from the interfering cell.

6. The method according to claim 5, wherein the recommendation of which one or more out of option 1 and option 2 to use for computing covariance at the UE, based on the first scheduling information and the second scheduling information, comprises:

when each symbol of one or more first parts of the current slot scheduled in the cell experiences interference from the interfering cell, the recommendation comprises to compute covariance at the UE by using option 1 for the one or more first parts of the current slot scheduled in the cell; and when no symbol of one or more second parts of the current slot scheduled in the cell experiences interference from the interfering cell, the recommendation comprises to compute covariance at the UE by using option 2 for the one or more second parts of the current slot scheduled in the cell.

7. The method according to claim 5, wherein the recommendation of which one or more out of option 1 and option 2 to use for computing covariance at the UE, based on the first scheduling information and the second scheduling information, comprises:

when no symbol of one or more third parts of the current slot scheduled in the cell does experience interference of the one or more interfering cells and each symbol of one or more fourth parts of the current slot scheduled in the cell does experience some interference from one or more interfering cells; and the recommendation comprises to compute covariance at the UE by using option 2, for both the one or more third parts and the one or more fourth parts of the current slot scheduled in the cell.

8. A network node configured to assist a User Equipment (UE) in detecting Downlink (DL) symbols to be received by the UE in a wireless communications network, which DL symbols comprise front loaded Demodulation Reference Signals (DMRS) and one or more additional DMRS, and which network node serves the UE in a cell, the network node comprising:

a processor; and a memory comprising instructions which, when executed by the processor, cause the network node to:

obtain a first scheduling information about the front loaded DMRS and the one or more additional DMRS in a current slot scheduled in the cell, wherein the first scheduling information is based on channel state information reported by the UE;

obtain a second scheduling information about empty symbols in the current slot from an interfering cell, wherein the second scheduling information is received from a neighbouring network node;

decide which one or more out of option 1 and option 2 to use for computing covariance at the UE, based on the first scheduling information and the second scheduling information, wherein option 1 comprises accumulated DMRS and option 2 comprises individual DMRS, and wherein to decide which one or more out of option 1 and option 2 to use for computing covariance at the UE, based on the first scheduling information and the second scheduling information, comprises to identify whether or not each symbol of the current slot scheduled in the cell experiences interference or not from the interfering cell, in which:

when each symbol of the current slot scheduled in the cell experiences interference from the interfering cell, decide to compute covariance at the UE by using option 1; and when each symbol of the current slot scheduled in the cell does not experience interference from the interfering cell, decide to compute covariance at the UE by using option 2; and send an indication to the UE, which indication is adapted to indicate a recommendation based on the deciding which one or more out of option 1 and option 2, to use for computing covariance at the UE for detecting the DL symbols.

9. A User Equipment (UE) configured to detect received Downlink (DL) symbols to be received by the UE in a wireless communications network, which DL symbols comprise front loaded Demodulation Reference Signals (DMRS) and one or more additional DMRS, and wherein a network node serves the UE in a cell, the UE comprising:

a processor; and a memory comprising instructions which, when executed by the processor, cause the UE to:

receive an indication from the network node, which indication indicates a recommendation of which one or more out of option 1 and option 2 to use for computing covariance at the UE, wherein option 1 comprises accumulated DMRS and option 2 comprises individual DMRS, and wherein the recommendation of which one or more out of option 1 and option 2 to use for computing covariance at the UE, is based on whether or not each symbol of a current slot scheduled in the cell experiences interference or not from an interfering cell, in which:

when each symbol of the current slot scheduled in the cell experiences interference from the interfering cell, the indication recommends to compute covariance at the UE by using option 1; and when each symbol of the current slot scheduled in the cell does not experience interference from the interfering cell, the indication recommends to compute covariance at the UE by using option 2;

receive, from the network node, information about a symbol level interference;

compute a covariance according to the recommendation and based on the information about a symbol level interference;

determine receiver weights based on the computed covariance; and detect the DL symbols based on the determined receiver weights.

10. The UE according to claim 9, wherein the recommendation is based on a first scheduling information about the front loaded DMRS and the one or more additional DMRS in the current slot scheduled in the cell, and a second scheduling information about empty symbols in the current slot from the interfering cell.

11. The UE according to claim 10, wherein the recommendation of which one or more out of option 1 and option 2 to use for computing covariance at the UE, based on the first scheduling information and the second scheduling information, comprises:

when each symbol of one or more first parts of the current slot scheduled in the cell experiences interference from the interfering cell, the recommendation comprises to compute covariance at the UE by using option 1 for the one or more first parts of the current slot scheduled in the cell; and when no symbol of one or more second parts of the current slot scheduled in the cell experiences interference from the interfering cell, the recommendation comprises to compute covariance at the UE by using option 2 for the one or more second parts of the current slot scheduled in the cell.

12. The UE according to claim 10, wherein the recommendation of which one or more out of option 1 and option 2 to use for computing covariance at the UE, based on the first scheduling information and the second scheduling information, comprises:

when no symbol of one or more third parts of the current slot scheduled in the cell does experience interference of the one or more interfering cells and each symbol of one or more fourth parts of the current slot scheduled in the cell does experience some interference from one or more interfering cells; and the recommendation comprises to compute covariance at the UE by using option 2 for both the one or more third parts and the one or more fourth parts of the current slot scheduled in the cell.

* * * * *